United States Patent
Kim et al.

(10) Patent No.: US 10,198,836 B2
(45) Date of Patent: Feb. 5, 2019

(54) TRELLIS CHART SCALING

(71) Applicant: salesforce.com, inc., San Francisco, CA (US)

(72) Inventors: Yuseung Kim, San Francisco, CA (US); Anwesha Samanta, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/468,714

(22) Filed: Mar. 24, 2017

(65) Prior Publication Data
US 2018/0067625 A1    Mar. 8, 2018

Related U.S. Application Data

(60) Provisional application No. 62/383,081, filed on Sep. 2, 2016.

(51) Int. Cl.
*G06T 11/20*    (2006.01)
*G06F 17/30*    (2006.01)

(52) U.S. Cl.
CPC ...... *G06T 11/206* (2013.01); *G06F 17/30994* (2013.01); *G06T 2200/24* (2013.01)

(58) Field of Classification Search
CPC ........... G06F 3/04842; G06F 17/30994; G06T 11/206; G06T 2200/24
See application file for complete search history.

(56) References Cited

U.S. PATENT DOCUMENTS

| 9,299,173 | B2 * | 3/2016 | Rope | G06T 11/206 |
| 2005/0099423 | A1 * | 5/2005 | Brauss | G06T 11/206 345/440 |
| 2014/0324521 | A1 * | 10/2014 | Mun | G06Q 10/06393 705/7.28 |

(Continued)

FOREIGN PATENT DOCUMENTS

WO    WO 2004061937    *   7/2004    ............. H01L 21/66

OTHER PUBLICATIONS

LeBlanc et al., Applied Microsoft Business Intelligence, All IT eBooks, Apr. 26, 2016, file:///C:/Users/dricks/Downloads/Applied%20Microsoft%20Business%20Intelligence%20(1).pdf.*

*Primary Examiner* — Maurice L. McDowell, Jr.
*Assistant Examiner* — Donna J. Ricks
(74) *Attorney, Agent, or Firm* — Sterne, Kessler, Goldstein & Fox P.L.L.C.

(57) ABSTRACT

A non-transitory tangible computer readable medium containing instructions configured to cause one or more processors to execute a process. The process comprises analyzing a dataset to determine a number of variables and one or more types of variables associated with the dataset. One or more processors remove a number of predefined discrete grouping variables from the number of variables associated with the dataset and produces a set of remaining variables. The one or more processors select a chart type based on the number of variables and the one or more types of variables associated with the set of remaining variables and generate one or more charts depicting the dataset. The number of charts generated corresponds to the number of data points associated with the predefined discrete grouping variables.

20 Claims, 19 Drawing Sheets

(56) References Cited

U.S. PATENT DOCUMENTS

| | | | |
|---|---|---|---|
| 2015/0112969 A1* | 4/2015 | Prabhu | G06Q 10/06 707/722 |
| 2015/0243059 A1* | 8/2015 | Matange | G06T 11/206 345/440 |
| 2016/0105325 A1* | 4/2016 | Fletcher | H04L 41/12 715/737 |
| 2016/0232457 A1* | 8/2016 | Gray | G06T 11/206 |

* cited by examiner

FIG. 5

TRELLIS CHART SCALING

BACKGROUND

A graphical user interface (GUI) is commonly implemented within a software client to enable users to graphically view and manipulate data retrieved from a database system. The GUI can display a dataset, received from the database system, in the form of a trellis chart. A trellis chart, sometimes known as lattice charts or grid charts, is a series of similar graphs or charts that is concurrently presented. Each of the graphs or charts shows a different partition of the dataset.

Conventional GUIs do not provide users an efficient way to dynamically scale charts within a displayed trellis chart. For example, a user cannot effectively zoom into the trellis chart to view a chart in greater detail. Further, current implementations of trellis charts present separate charts or graphs with independently scaled axes, which hinders the user's ability to easily compare the charts.

BRIEF DESCRIPTION OF THE DRAWINGS

FIG. 5 shows an example diagram of an example trellis chart of pie charts, according to some embodiments.

DETAILED DESCRIPTION

Provided herein are system, method, article of manufacture, or computer product embodiments, or combinations and sub-combinations thereof, for providing charts having dynamically adjusted reference scaling.

Figure 1:
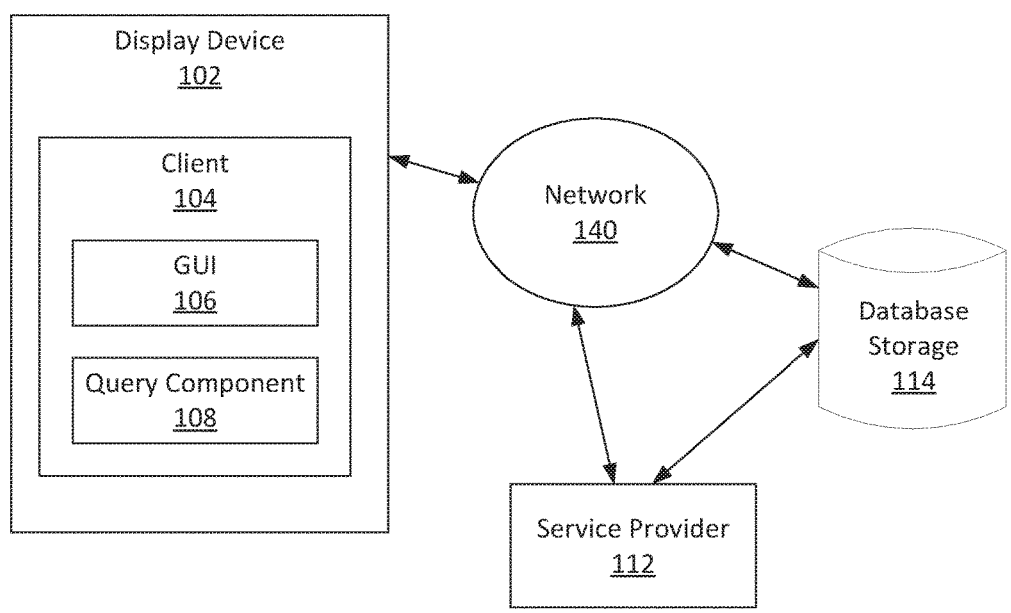
FIG. 1 shows an example system for providing trellis chart navigation and scaling, according to some embodiments.

FIG. 1 shows an example system 100 for providing a trellis chart, according to some embodiments. System 100 includes display device 102 that communicates with service provider 112 or database storage 114 through network 110. Network 110 may be, for example, a LAN (Local Area network), MAN (metropolitan area network), WAN (Wide Area Network) such as the Internet, or any combination thereof. Network 110 may further utilize Ethernet communications, although other wired or wireless communication techniques, protocols, and technologies can be used.

In an embodiment, service provider 112 connects to database storage 114 to issue queries on data stored in database storage 114. Database storage 114 may be queried by, for example, display device 102. Queries can include one or more of the following types of statements: data definition language (DDL), data manipulation language (DML), data control language (DCL), transaction control (TCL), or any combination thereof. For example, a query received from display device 102 may be a DML statement to retrieve data from database storage 114 according to specified criteria. In an embodiment, service provider 112 includes a database management system to communicate with database storage 114. Service provider 112 may be implemented on one or more servers, which may operate in a distributed environment. Each of these servers may be software, suitable hardware, or a combination thereof that responds to other computers and devices in a network.

In an embodiment, database storage 114 is a relational database that stores and organizes data into one or more database tables. Each database table has a number of rows (i.e., records) and columns (i.e., fields). Each row in a table generally has a data value associated with each column of the table. This intersection between one row and one column is commonly referred to as a cell. This information may be business information relevant to a user operating device 102. Business information may be, for example, sales transactions, client information, advertisement information, etc. To access or perform analysis on this information stored in database storage 114, service provider 112 issues a request in the form of a query. In an embodiment, database storage 114 is configured to respond to queries issued by display device 102 over network 110. For example, service provider 112 may provide this configuration.

In an embodiment, display device 102 implements client 104 to enable users to query database storage 114. Client 104 may query database storage 114 directly or indirectly via service provider 112. Client 104 can be a thin client or a thick client. In an embodiment, client 104 is an application, e.g., mobile application, downloaded from service provider 112 via network 110. Display device 102 is any computing device capable of connecting to network 110 and having a screen for displaying data. For example, a computing device may be a laptop, a desktop computer, a tablet, a wearable device, or a mobile device (e.g., a mobile phone).

In an embodiment, client 104 includes a graphical user interface (GUI) 106 and query component 108. GUI 106 presents various graphical icons that enable users to interact with data from database storage 114. Query component 106 formats selected graphical icons or input received from GUI 106 into one or more queries. Then, query component 106 issues these queries to database storage 114 or service provider 112 via network 110.

In an embodiment, GUI 106 generates one or more charts within a trellis chart to graphically represent query results within a display area of display device 102. The display area may be, for example, a window or container operated by client 104 and displayed on display device 102. The display area, when maximized (if allowable), can be at its largest, the size of the display screen of display device 102. In an embodiment, GUI 106 includes selectable graphical icons to enable a use to select a desired chart to graphically present query results within the display area. For example, selectable charts may include column charts, bar charts, line charts, area charts, scatter charts, among other types of charts having an x-axis and a y-axis. The chart type may be selected based on the type of data to graph. For example, line charts are commonly selected to display trends over time.

In an embodiment, GUI 106 generates a trellis chart with displayed charts having dynamically scalable axes. Particularly, GUI 106 implements each of the displayed charts with scale labels whose presentation are dynamically adjusted to maintain readability of these labels regardless of the allotted display area on display device 102. These dynamically scalable axis and dynamically-adjusted scale labels may include one or more scale labels for the x-axis, the y-axis, or both of the charts. In an embodiment, based on a received command to re-render the trellis chart, GUI 106 determines whether to update the scaling of one or more displayed charts of the trellis chart. Based on this determination, GUI 106 further adjusts a presentation of corresponding axis scaling and scale labels to maintain readability as a user navigates, e.g., by selecting portions, within the trellis chart.

FIGS. 2A-2D show example diagrams 200A-D of how a graphical user interface (GUI) adjusts a trellis chart for comparing one measure as a user zooms out of the trellis chart, according to some embodiments. For example, the GUI presents a trellis chart for comparing one measure, e.g., sales, for agents across various regions, e.g., US (United States) or AP (Asian Pacific).

In an embodiment, the GUI receives a user's command to zoom out of the currently displayed trellis chart of diagram 200A. In response, the GUI dynamically scales the axis of the four charts within the trellis chart of diagram 200A to enable more charts, e.g., a total of 9 charts, to be displayed in the trellis chart of diagram 200B. As shown in diagram 200B, the GUI may omit every other scale label in the axis as the individual charts within the trellis chart shrink in size. In an embodiment, a different scaling than that used in the trellis chart 200A may be presented for the trellis chart of diagram 200B. As the user zooms further out, the GUI further omits scale labels as shown in diagram 200C.

In an embodiment, the GUI receives the user's command to zoom in or out of the displayed trellis chart based on an input detected by display device 102 of FIG. 1. For example, the input may be received from a mouse or keyboard communicatively coupled to display device 102. In an embodiment where display device 102 includes a touchscreen, the input may be a gesture, e.g., a pinching in/out, performed on the touchscreen and detected by the GUI. In an embodiment, the user may issue a command to zoom into a single chart of a presently displayed trellis chart, as further described with respect to FIGS. 6A-6B.

In an embodiment, to maintain consistency and readability of displayed charts within a trellis chart, the GUI determines axis scales to apply to each of the currently displayed charts. For example, as shown in each of FIGS. 2A-2D, the axis scales for each of the displayed charts remain consistent. In an embodiment, the GUI provides a selectable option to the user to either maintain a consistent axis for the charts within the trellis chart or to have each chart maintain its own axis.

In an embodiment, when the GUI is commanded to maintain consistent axes, the GUI calculates the minimum and maximum measures for each of the axes of the set of graphs currently displayed within a trellis chart. For example, the GUI determines the minimum and maximum sales for agents within the four charts displayed in FIG. 2A. Similarly, the GUI determines the minimum and maximum sales for agents within the nine charts displayed in FIG. 2B. Then, the GUI determines a single axis and associated scale labels to apply to each of the displayed charts of the trellis chart. In an embodiment, the determined single axis includes the determined minimum and maximum values.

Figure 2A:
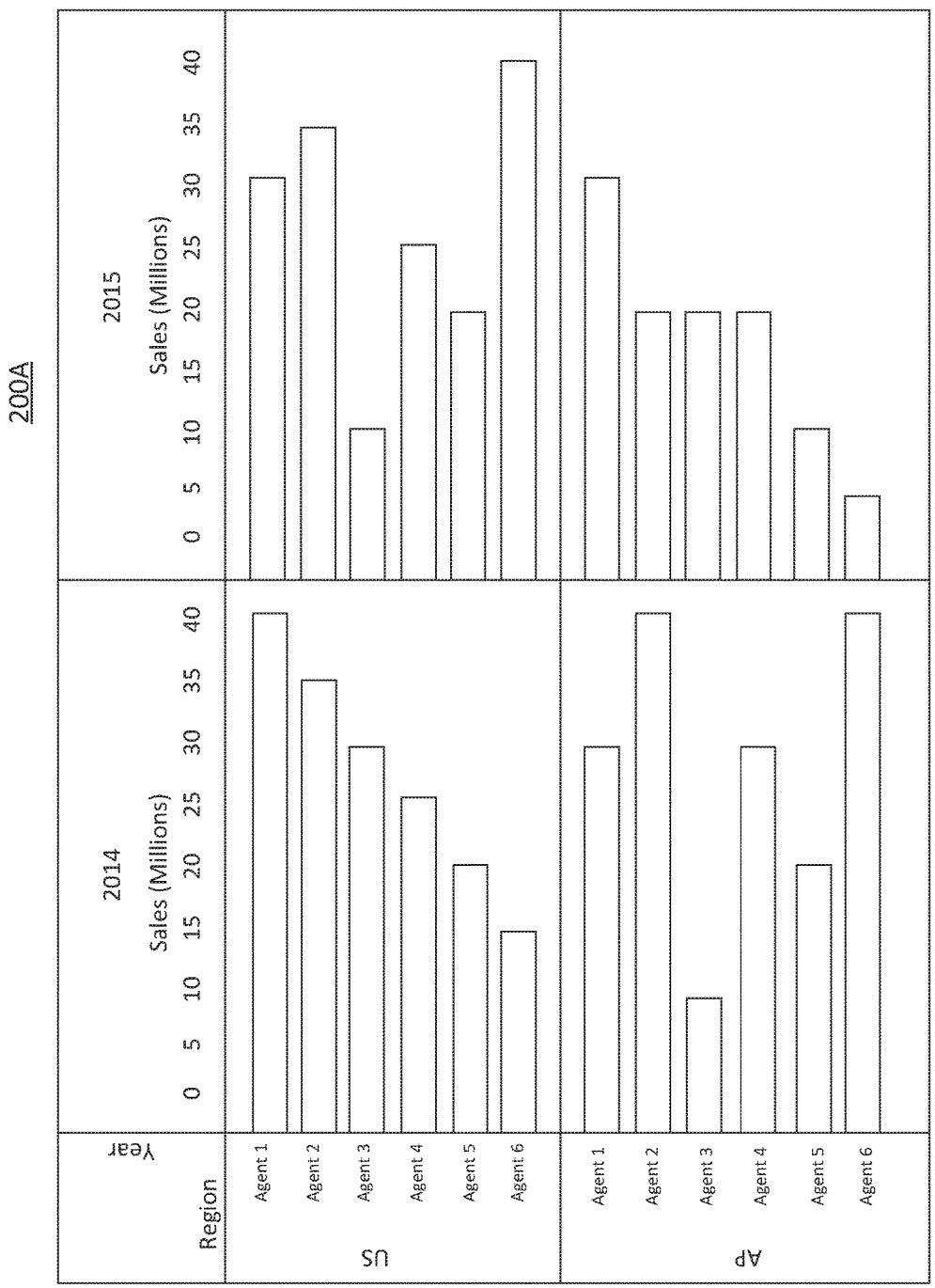
FIGS. 2A-2D show example diagrams of how a graphical user interface (GUI) adjusts a trellis chart for comparing one measure as a user zooms out of the trellis chart, according to some embodiments.
Figure 2B:
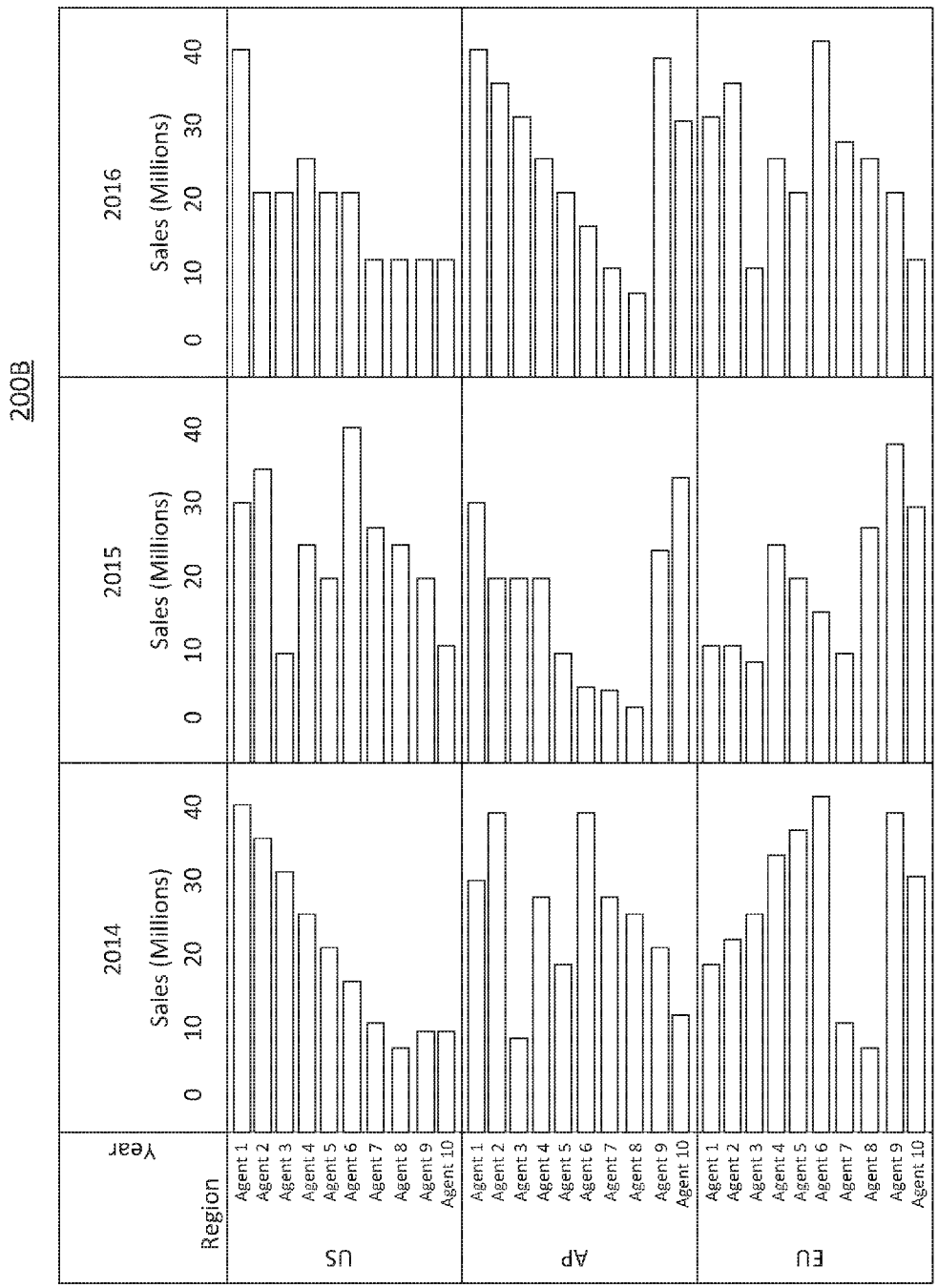
Figure 2C:
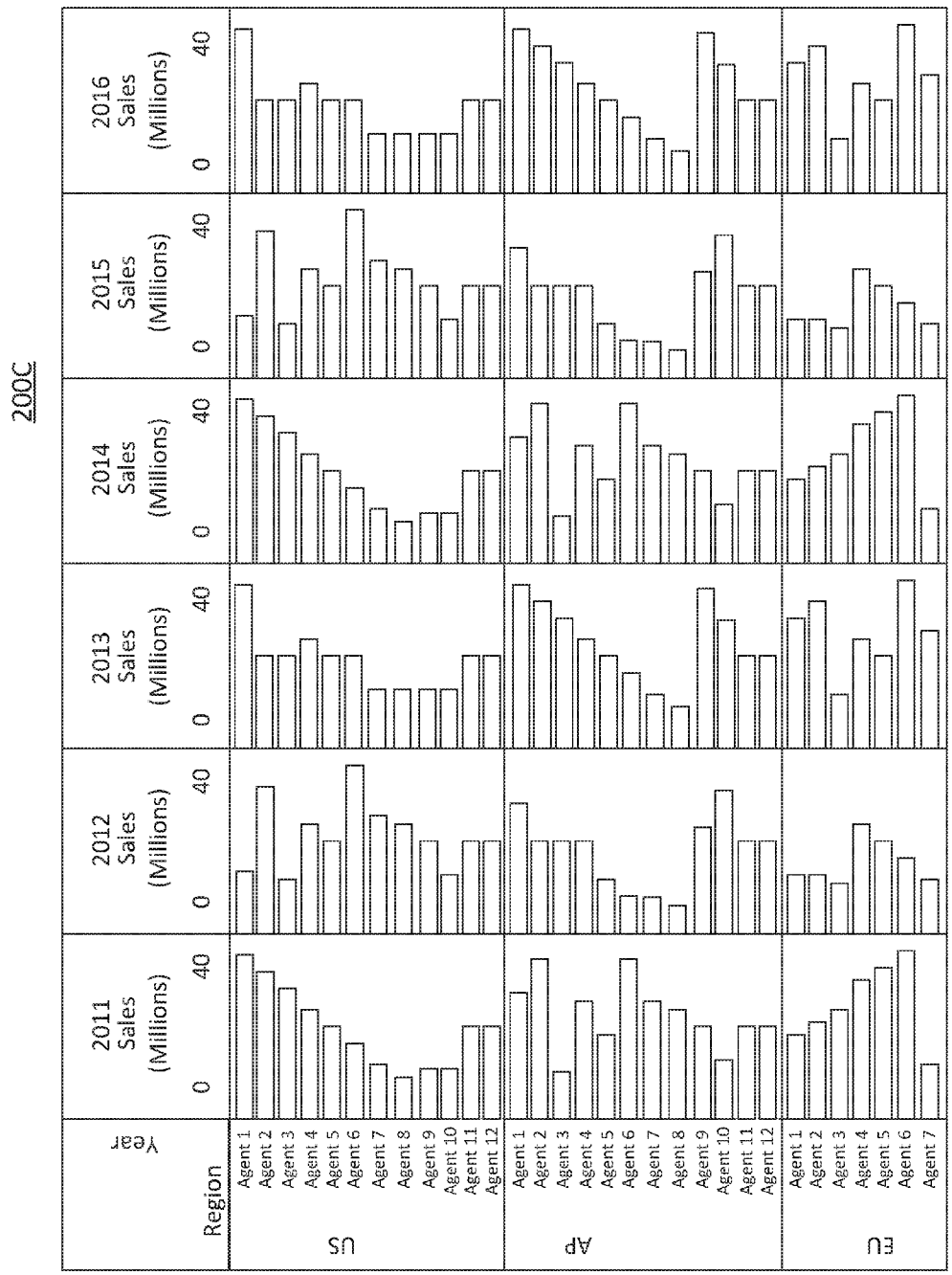
Figure 2D:
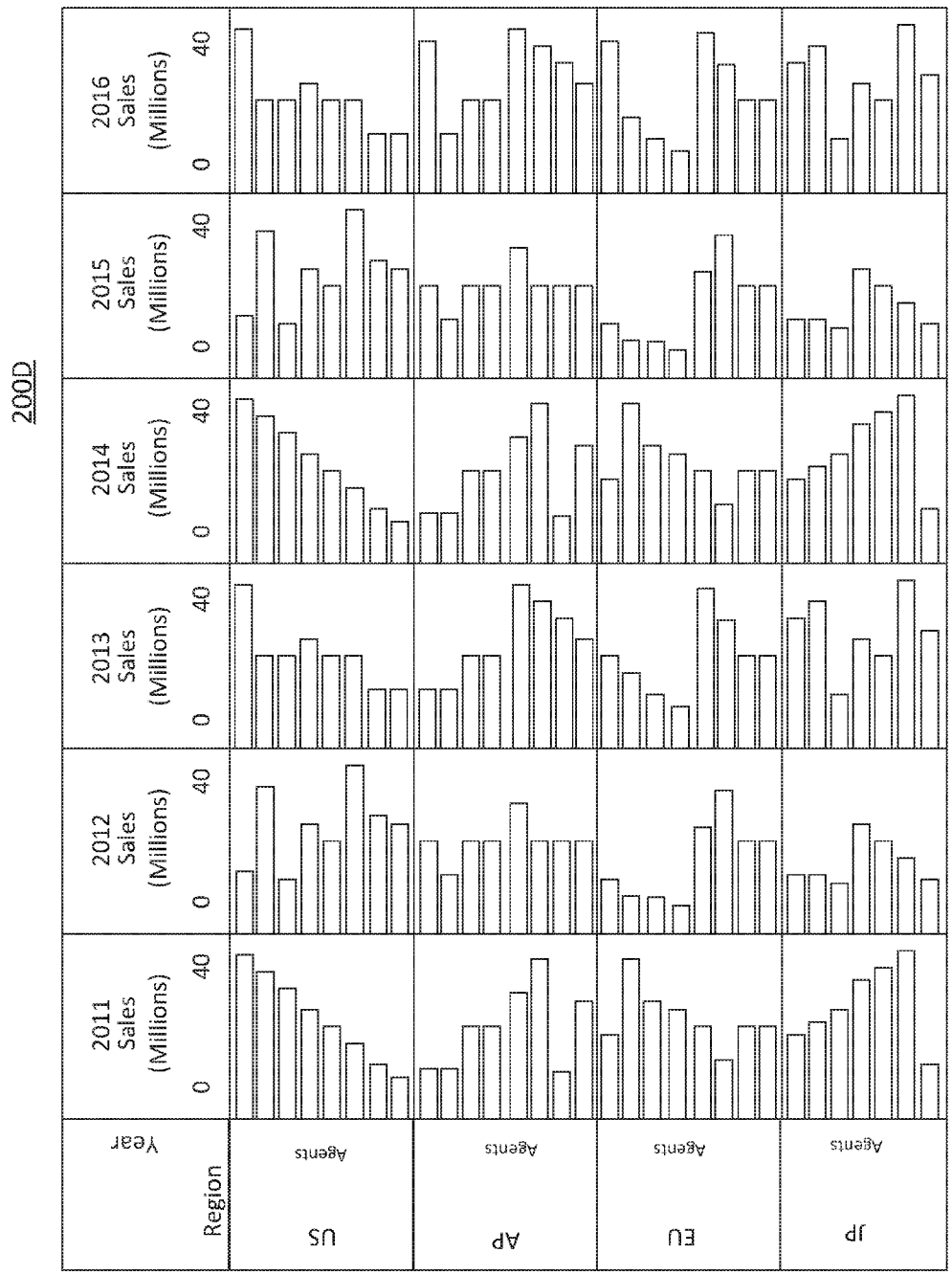
Figure 3A:
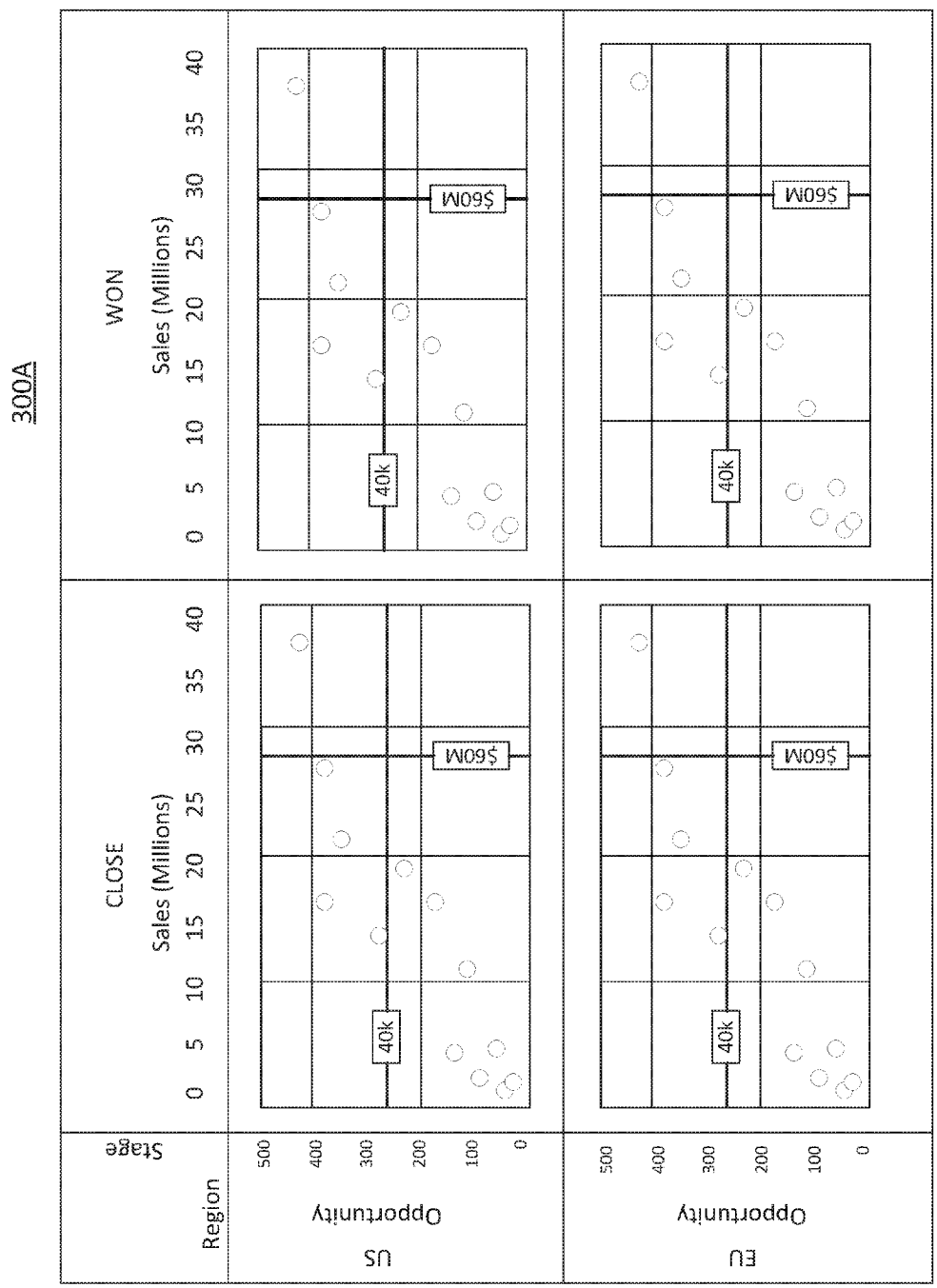
FIGS. 3A-3C show example diagrams of how a graphical user interface (GUI) adjusts a trellis chart for comparing two measures as a user zooms out of the trellis chart, according to some embodiments.
Figure 3B:
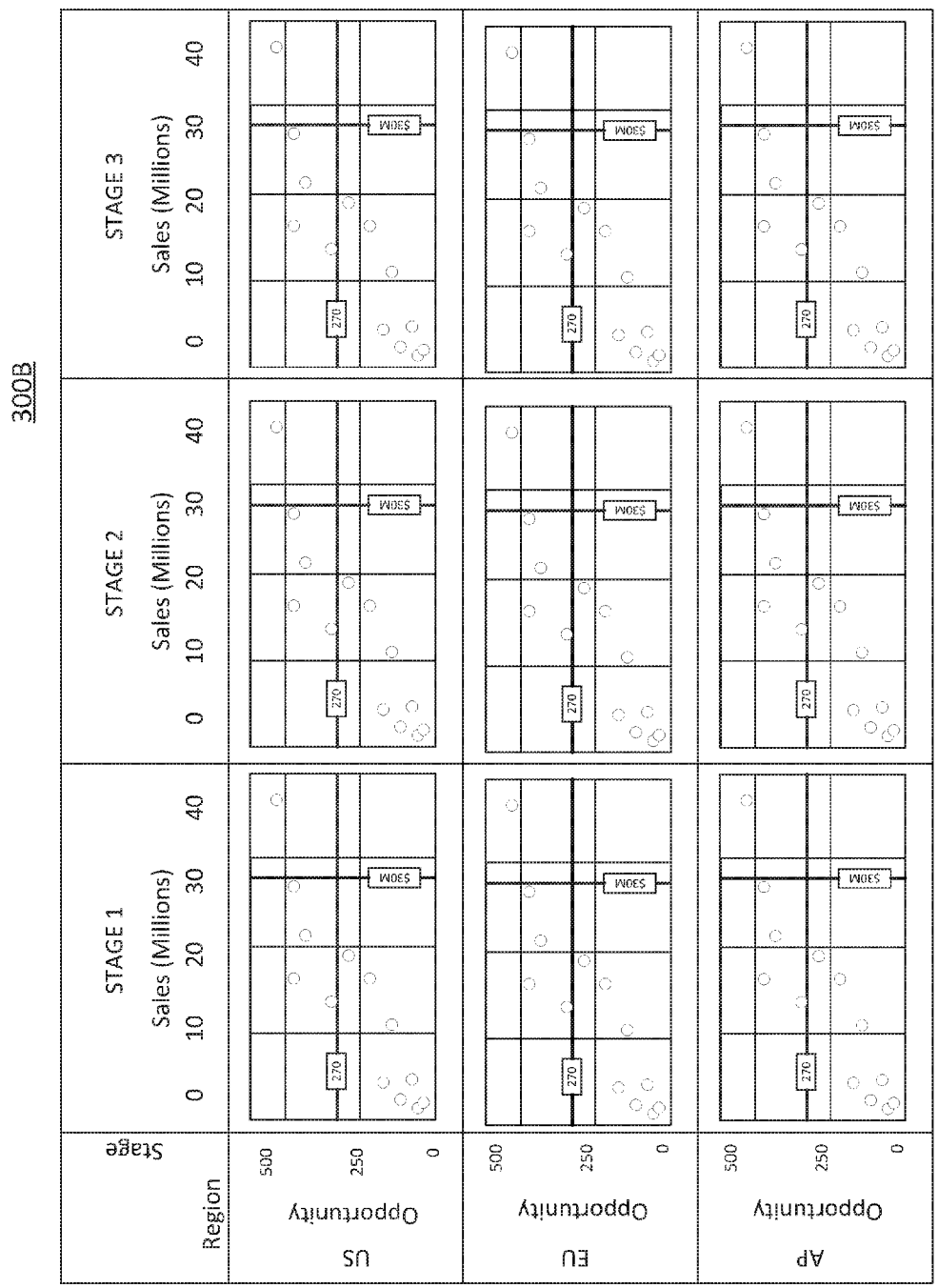
Figure 3C:
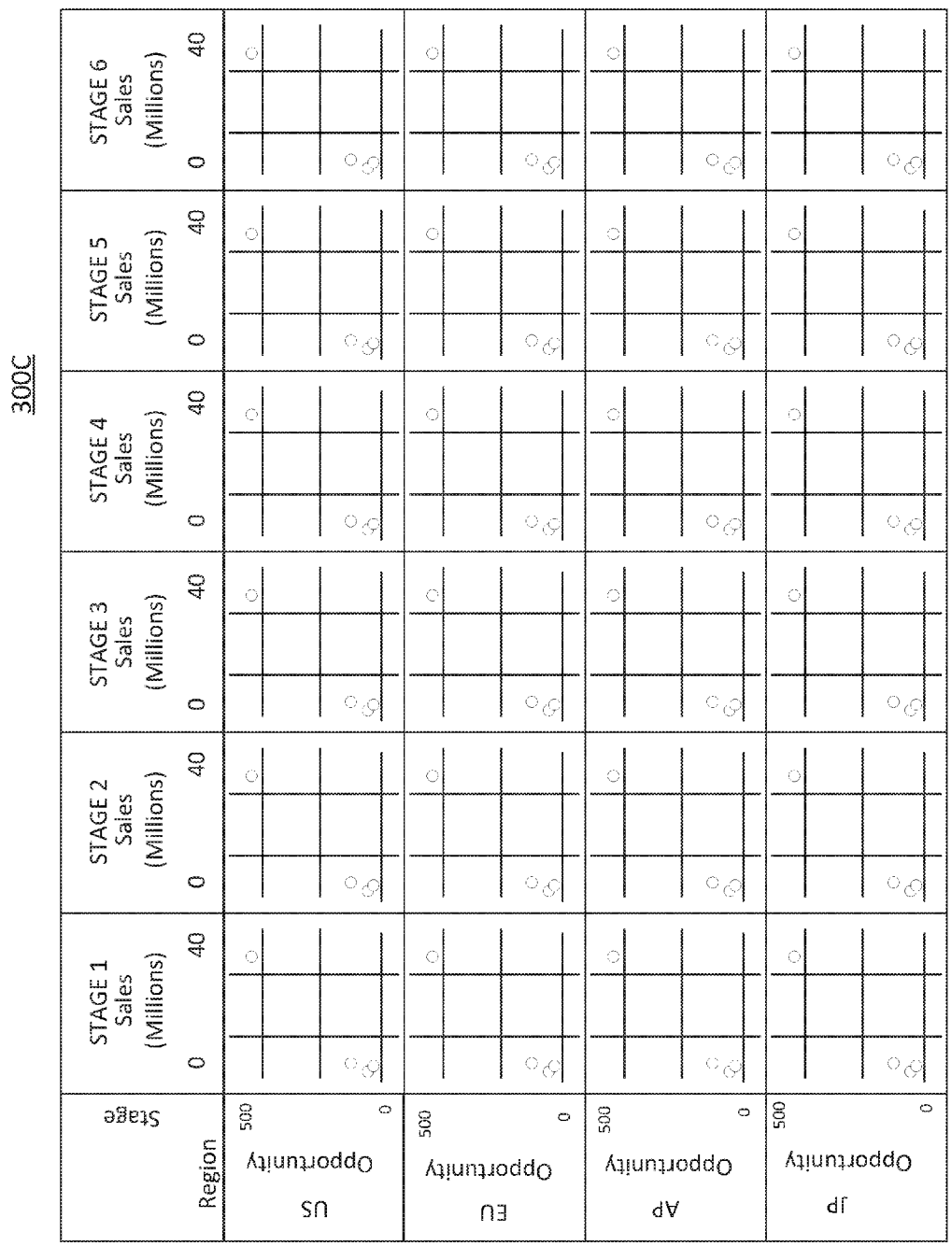

FIGS. 3A-3C show example diagrams 300A-C of how a graphical user interface (GUI) adjusts a trellis chart for comparing two measures as a user zooms out of the trellis chart, according to some embodiments. For example, the two measures are sales (in millions) and opportunity (counts). In an embodiment, these measures are continuous variables as described in more detail with regard to FIGS. 11A-11B. As shown in diagrams 300A-C, the trellis chart may include a series of scatter plots among other types of charts. As described with respect to FIGS. 2A-2D and 11A, the GUI can determine axis scales and labels that are applied to each of the displayed charts of the trellis chart. This feature allows the user to more easily compare the data across different charts. Altering the scales to avoid clutter also creates a more aesthetic chart presentation.

Figure 4A:
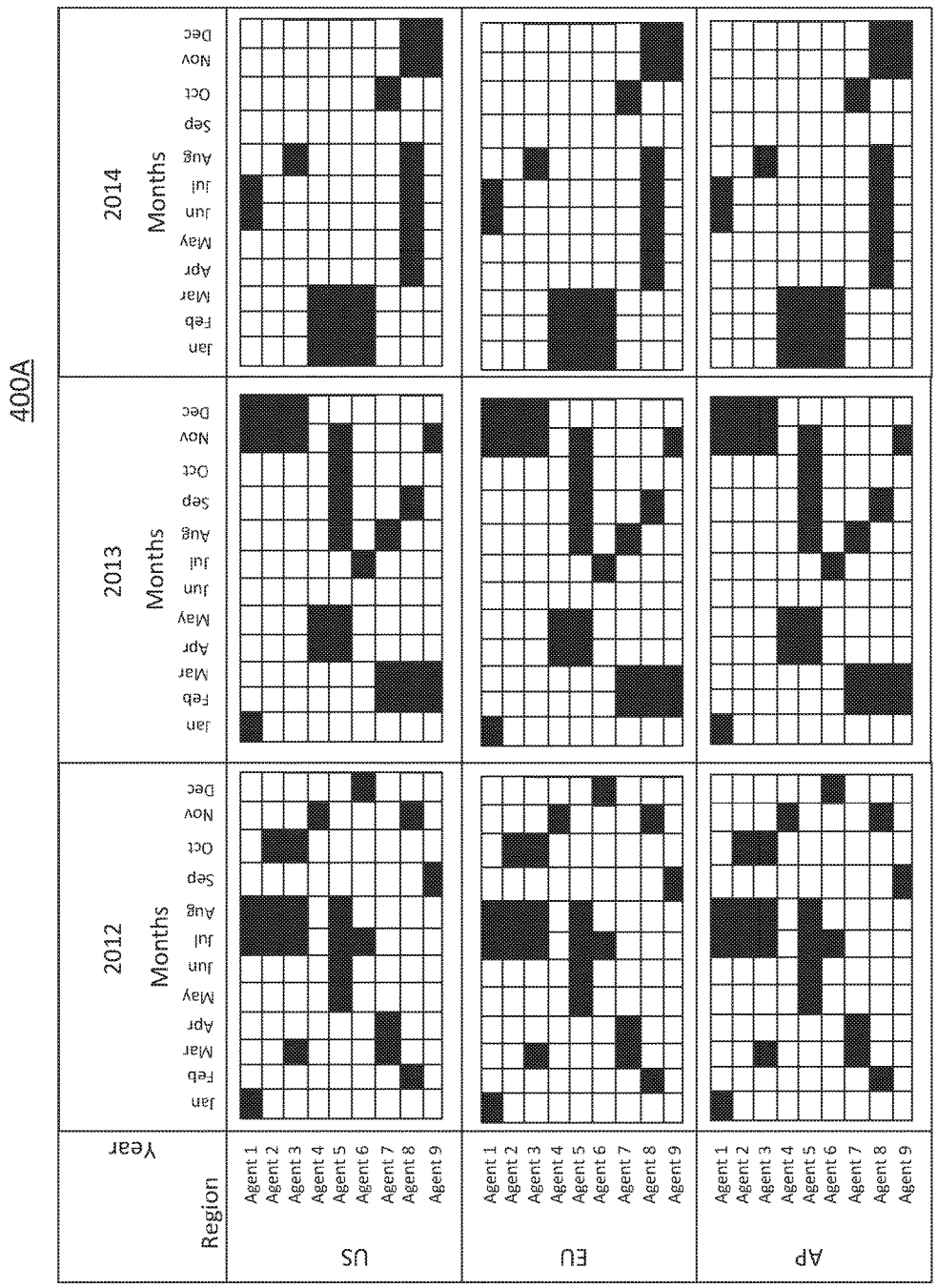
FIGS. 4A-4B show example diagrams of how a graphical user interface (GUI) adjusts a trellis chart for comparing one measure as a user zooms out of the trellis chart, according to some embodiments.
Figure 4B:
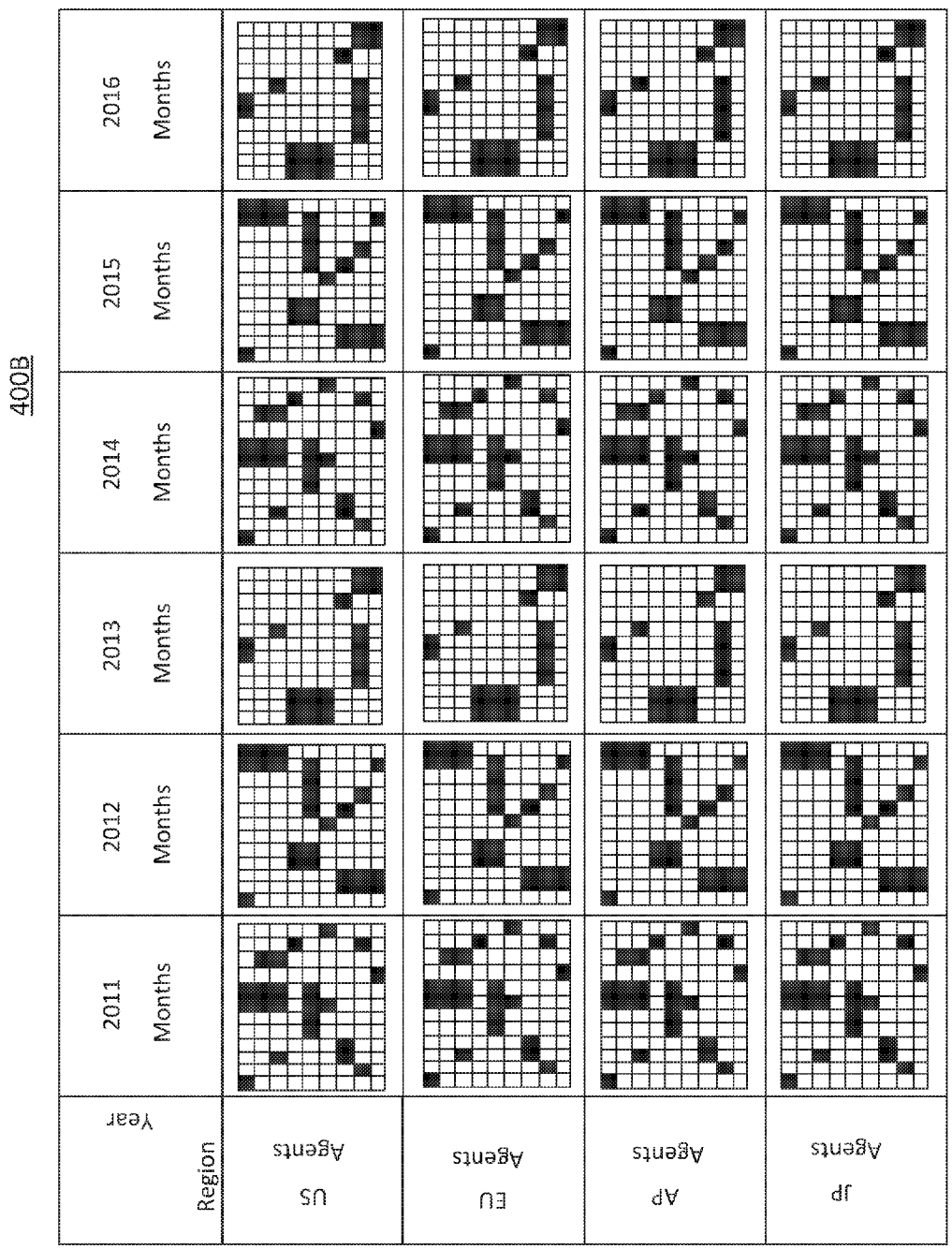

FIGS. 4A-4B show example diagrams 400A-B of how a graphical user interface (GUI) adjusts a trellis chart for comparing one measure as a user zooms out of the trellis chart, according to some embodiments. For example, a measure may be time (in months). Further, as shown, the trellis chart can include a heat map or a matrix. As explained in more detail with respect to FIG. 11B, a matrix and/or heat map chart may be generated to display two discrete variables and a continuous variable. For example, the axes for a matrix and/or heat map may be an agent identification number versus a month. The chart area may then represent a threshold in the case of a matrix or a coloring or grayscale model with respect to a heat map. In the matrix case, a binary value may be determined. For example, the chart area may depict whether a particular agent has generated more than $100,000 in a given month. The matrix will depict a different color and/or symbol for both binary states. In FIG. 4A and FIG. 4B, a darkened space may represent a value exceeding a threshold while a white space may represent a value that does not exceed the threshold. In an embodiment, multiple states may be utilized using different colors and/or symbols. For example, the chart area may utilize the color red for "Below $300,000," the color yellow for "Between $300,000 and $600,000," and the color green for "Above $600,000."

In a heat map embodiment, the chart area may depict a continuous value by utilizing different colors and/or a grayscale to depict a continuous value. In an embodiment, a darker or blacker data point correlates to more revenue generated while a lighter or whiter data point correlates to less revenue generated.

If a user interacts with the matrix and/or heat map charts depicted in FIG. 4A and requests additional information, such as more years, more corresponding charts may be generated as depicted in FIG. 4B. To maintain trellis charting, the scales of the axes may be adjusted to remove potential clutter.

Figure 5:
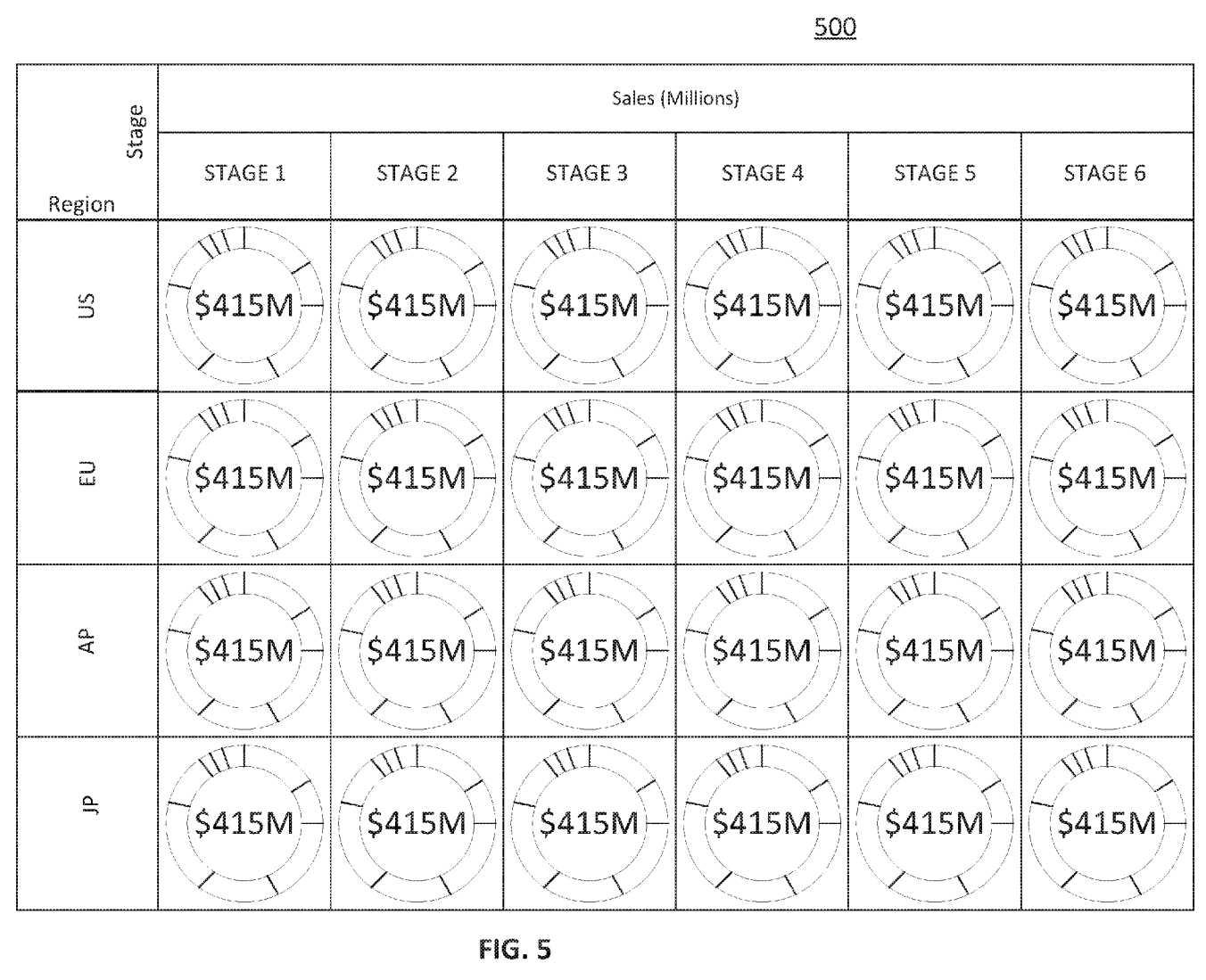

FIG. 5 shows an example diagram 500 of an example trellis chart of pie charts, according to some embodiments. As shown, each pie chart shows the sales for different regions relative to stages. In an embodiment, the graphical user interface depicting pie charts is used when information is stored as a "piece of a whole" and is best visualized when percentages of values are recorded. Multiple pie charts may be utilized to generate a trellis chart of pie charts. This trellis feature allows for scalability and grants a user the ability to visually recognize the relative magnitudes of different portions of a pie chart. The trellis chart feature allows the user to easily compare relative portions among different pie charts.

Figure 6A:
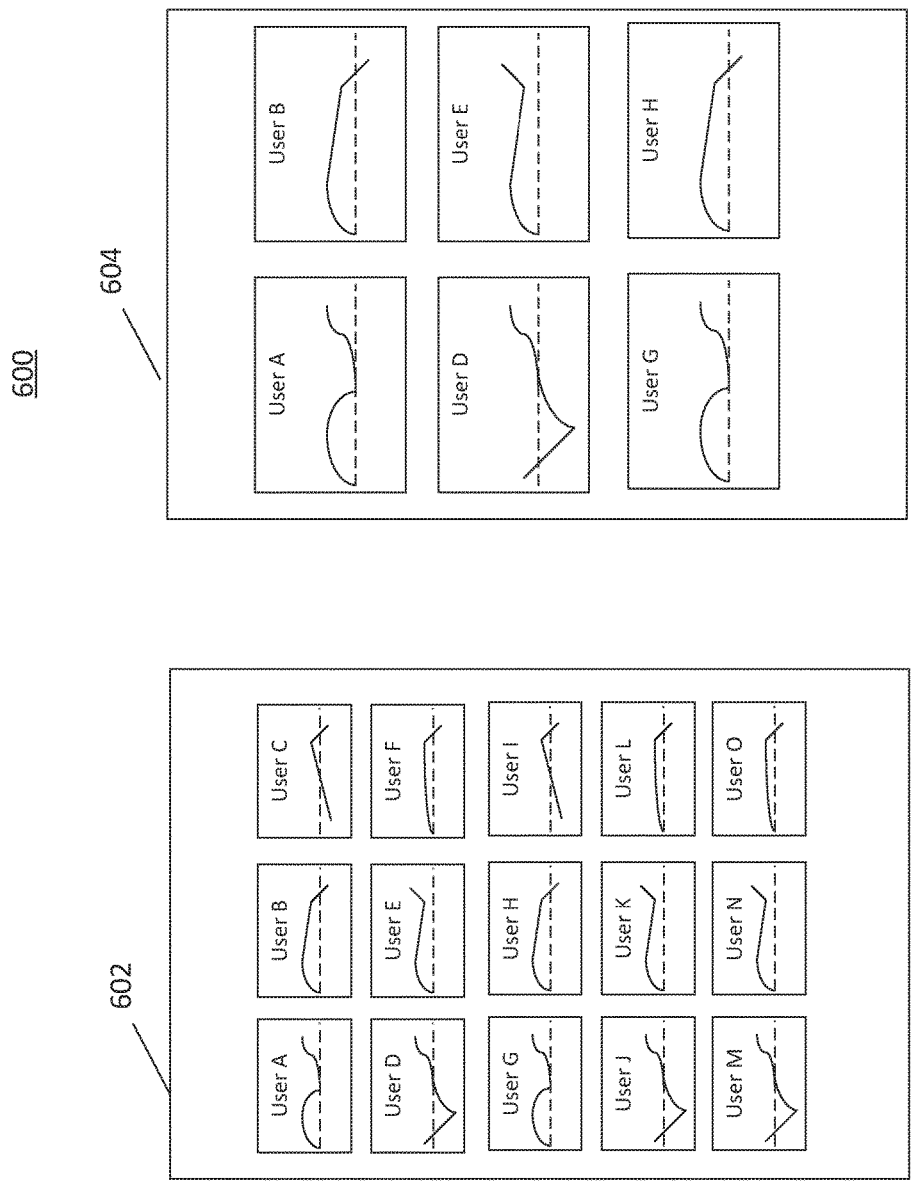
FIGS. 6A-6B show an example diagram of how a GUI adjusts a trellis chart as a user zooms into the trellis chart, according to some embodiments.
Figure 6B:
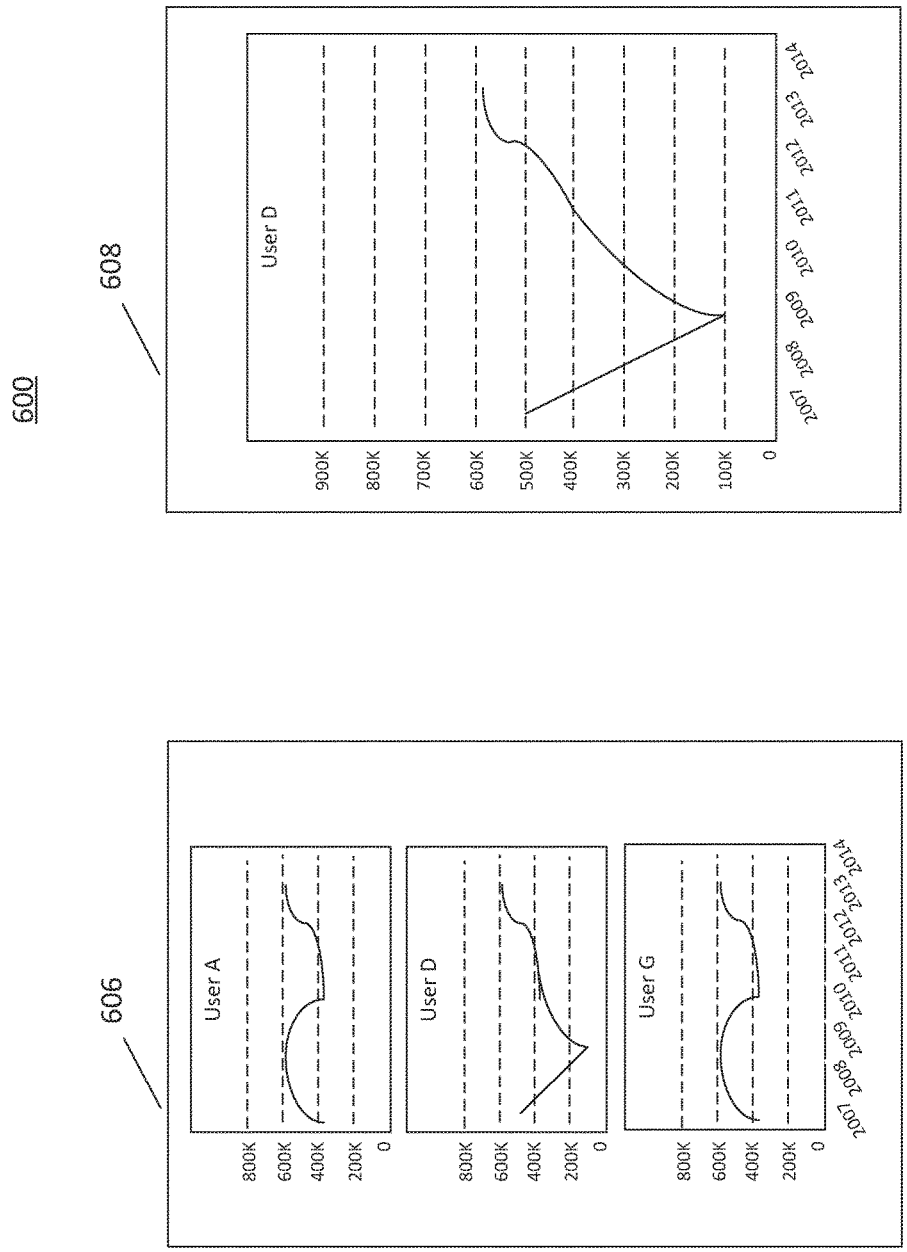

FIGS. 6A-6B show an example diagram 600 of how a GUI adjusts a trellis chart as a user zooms into the trellis chart, according to some embodiments. In an embodiment, as the user zooms into the trellis chart, the GUI resizes the axis scales of displayed charts. In an embodiment, the GUI maintains a consistent axis scale as the user zooms from the display 602 to display 608. As shown in display 608, the GUI is commanded to zoom into a single chart from the trellis chart of display 602 showing 15 charts. In an embodiment, the GUI processes a zoom out gesture in a similar manner. For example, as the user can zooms out from the "User D" chart of display 608, the GUI presents more charts, e.g., three charts in display 606 and six charts in display 604, within the trellis chart. Then, the user may zoom into a different portion of the displayed trellis chart to select a different chart for viewing in greater granularity. For example, a user may zoom into the "User G" chart of display 606, which would cause the GUI to select and rescale the "User G" chart for displaying within display 608 instead of the "User D" chart.

Figure 7:
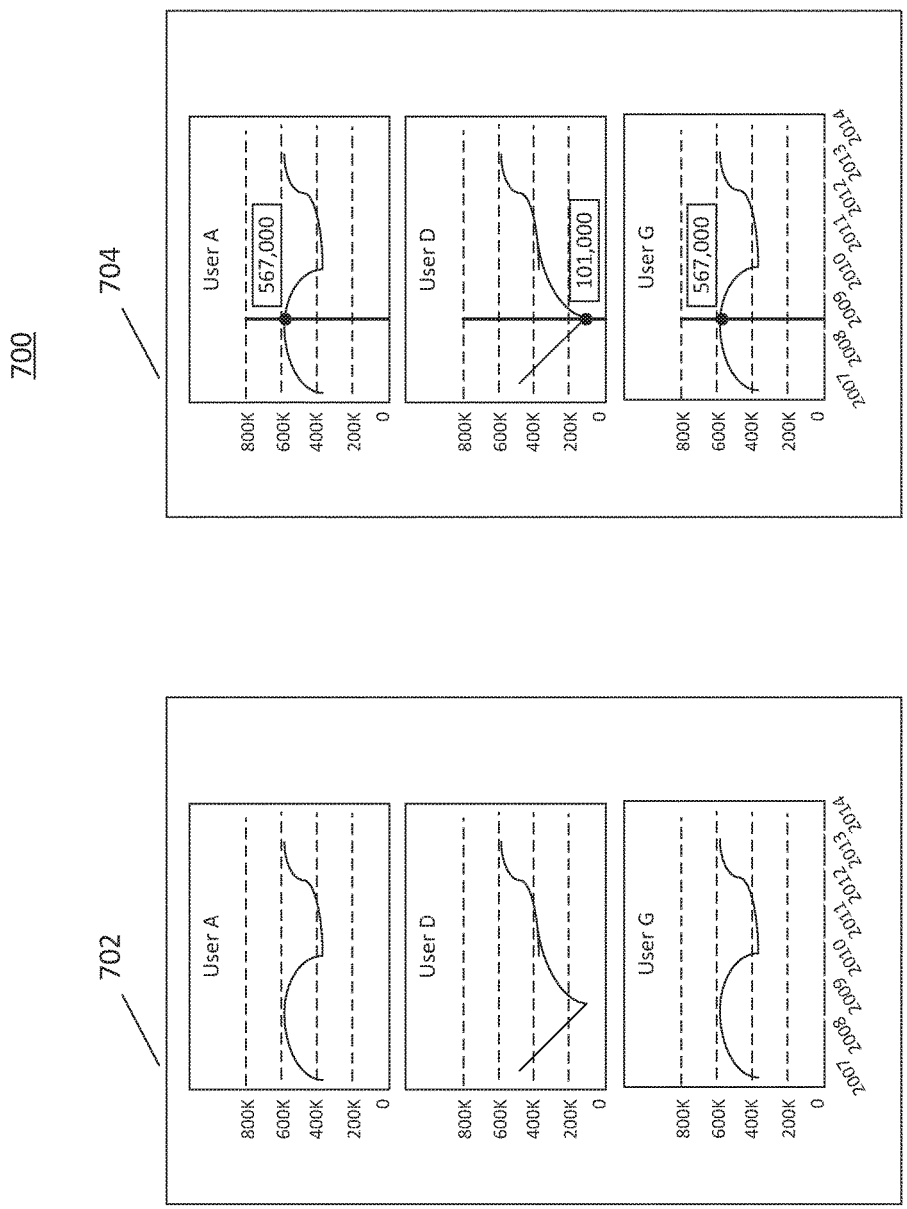
FIG. 7 shows an example diagram of how a GUI provides to a user a feature to compare graphs or charts displayed within a trellis chart, according to some embodiments.

FIG. 7 shows an example diagram 700 of how a GUI provides to a user a feature to compare graphs or charts displayed within a trellis chart, according to some embodiments. In GUI 702, three charts are displayed using a similar axis scale. The three charts depict three users and line graphs demonstrating performance correlated to each year. In an embodiment, as a user hovers over or selects a portion of any of the displayed charts, GUI 704 presents a common indication across each of the displayed charts and concurrently shows corresponding values. For example, selecting a time period between the year 2008 and 2009 yields line and magnitude information for the same time measurement among different users. This shared measurement across different charts allows for comparisons to be made more easily among charts, highlighting a feature of trellis charting.

Figure 8:
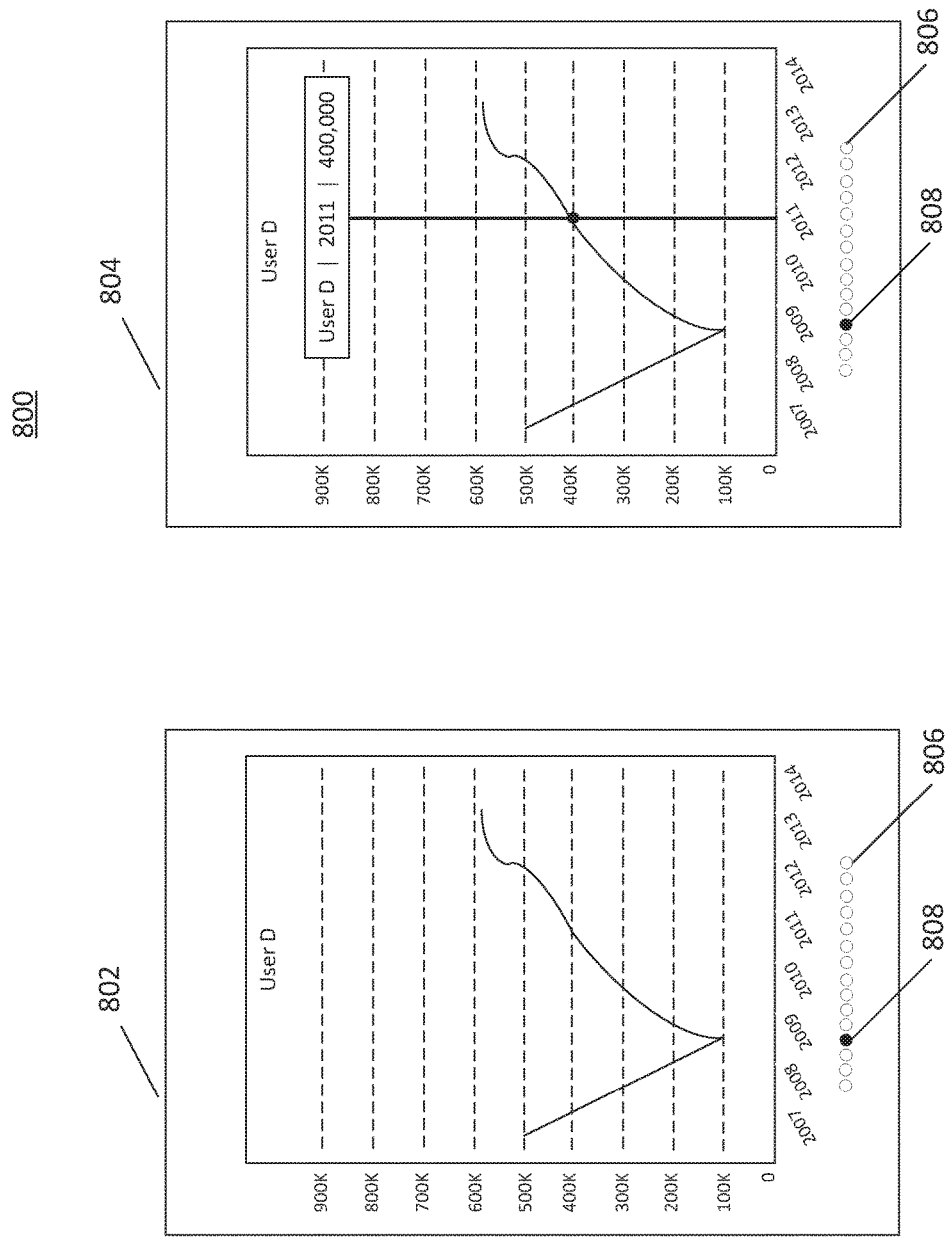
FIG. 8 shows an example diagram of how a GUI provides to a user a feature to view details within a displayed chart selected from a trellis chart, according to some embodiments.

FIG. 8 shows an example diagram 800 of how a GUI provides to a user a feature to view details within a displayed chart selected from a trellis chart, according to some embodiments. GUI 802 provides a view of a line chart for a single user, plotting a performance metric, such as sales or revenue, against a time measure, such as the year. As a user hovers or selects a portion of a displayed chart on GUI 802, GUI 804 provides an indication of the portion selected and associated data, e.g., name, year, and sales. GUI 804 allows a user to navigate various measures of data within a line chart.

In an embodiment, GUI 802 and GUI 804 also contain one or chart selectors 806. Chart selectors 806 are GUI objects that allow a user to choose between different charts. The different charts may be of the same chart type, e.g., a line chart, but may allow for the selection of different users. For example, "User D" may be selected for display in GUI 804 but a user may select different users using chart selectors 806. To highlight the selected user, chart indicator 808 may be utilized. Chart indicator 808 is a GUI object which highlights the selected chart. As a user interacts with chart selectors 806, chart indicator 808 may move to highlight the currently displayed chart. In an embodiment, a user may select different charts using an input mechanism such as a click on a computer and/or laptop mouse or may utilize gestures on touchscreen devices such as a tap and/or swipe motion.

Figure 9:
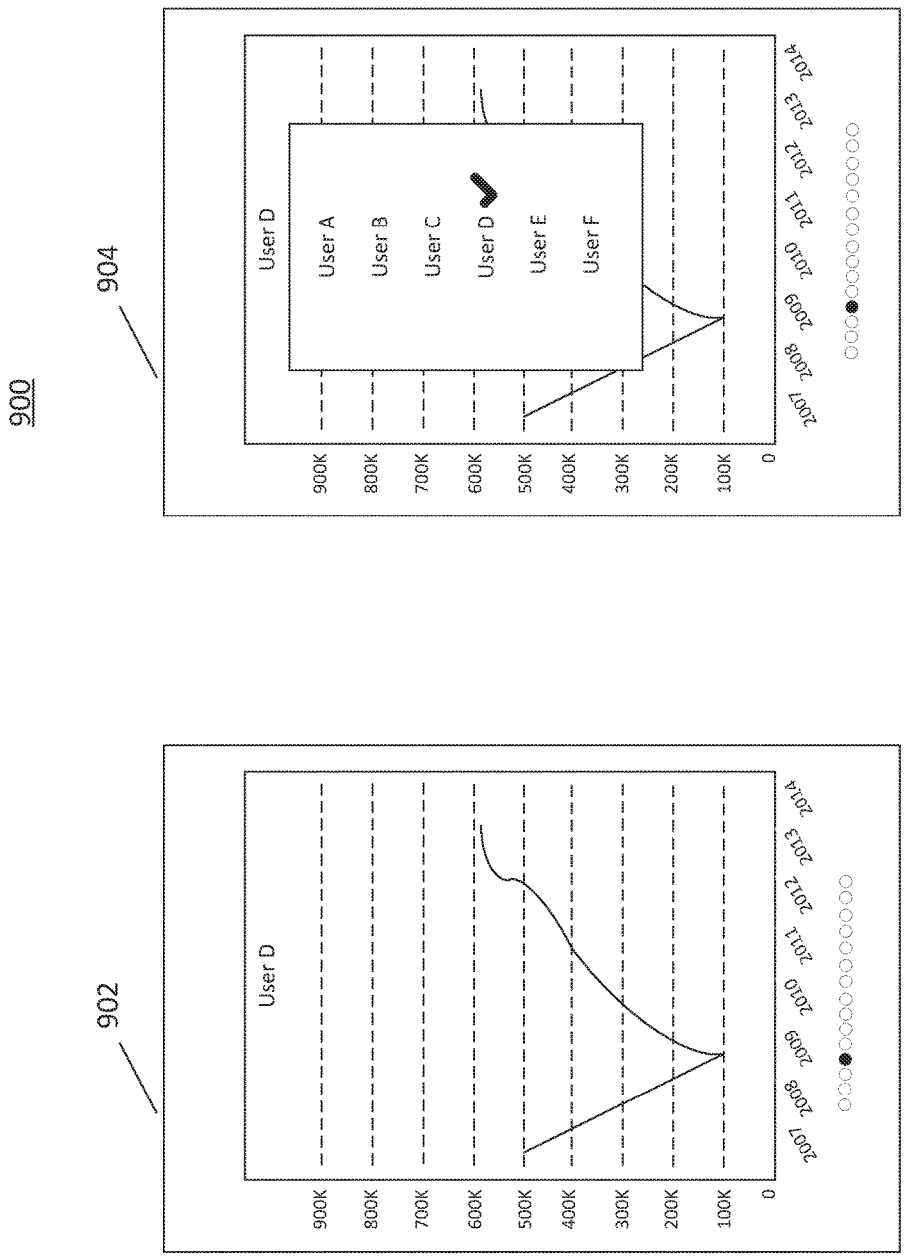
FIG. 9 shows an example diagram of how a GUI provides to a user a feature to select a chart to display from a trellis chart, according to some embodiments.

FIG. 9 shows an example diagram 900 of how a GUI provides to a user a feature to select a chart to display from a trellis chart, according to some embodiments. GUI 902 provides a view of a line chart for a single user, plotting a performance metric, such as sales or revenue, against a time measure, such as the year. In an embodiment, the "User D" chart within GUI 902 corresponds to the similarly named "User D" chart from the trellis chart of display 602 in FIG. 6A. Through user interaction with GUI 902, GUI 904 presents an interface, e.g., a dropdown menu, from which a user can select a chart from the trellis chart of display 602. In an embodiment, a user may instantiate the menu by interacting with the user name title of the chart. The menu allows for a quick selection among different charts to visualize data relevant to the user.

Figure 10:
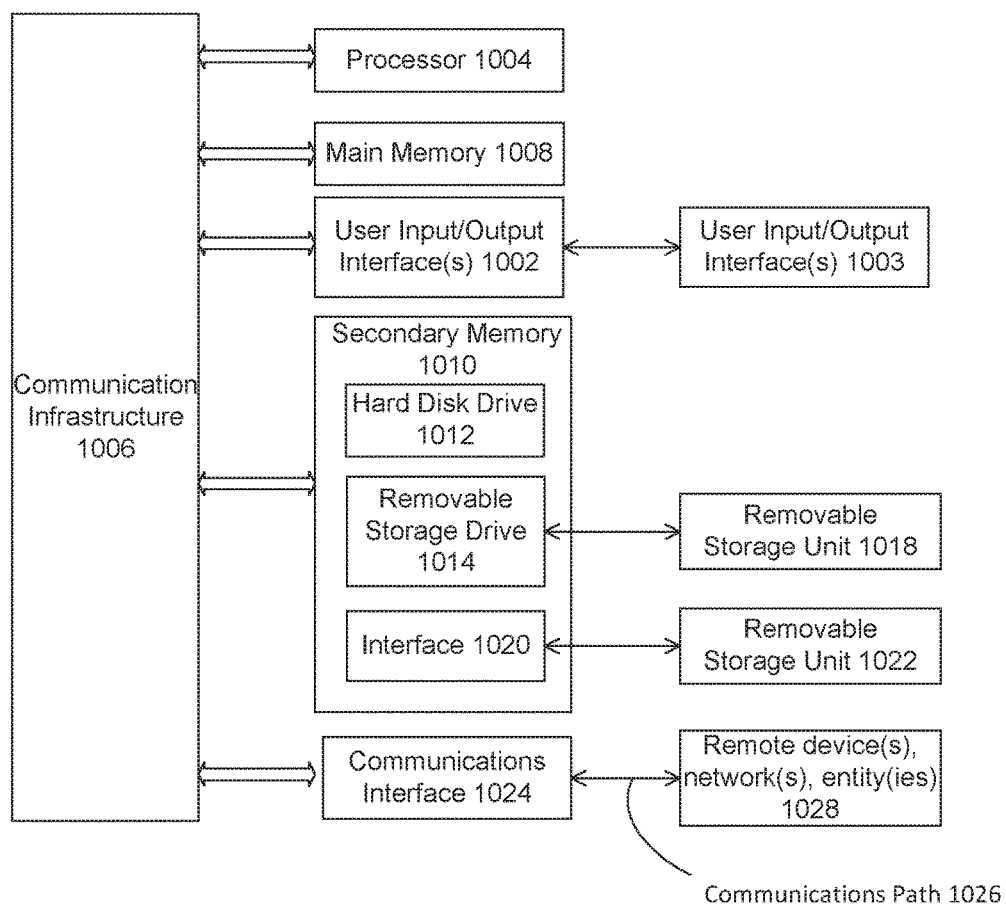
FIG. 10 shows an example computer system, according to some embodiments.

Various embodiments, such as display device 102 or service provider 102 of FIG. 1 can be implemented, for example, using one or more well-known computer systems, such as computer system 1000 shown in FIG. 10. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more scale levels of cache. Main memory 1008 has stored therein control logic (i.e., computer software) or data.

Computer system 1000 may also include one or more secondary storage devices or memory 1010. Secondary memory 1010 may include, for example, a hard disk drive 1012 or a removable storage device or drive 1014. Removable storage drive 1014 may be a floppy disk drive, a magnetic tape drive, a compact disk drive, an optical storage device, tape backup device, or any other storage device/drive.

Removable storage drive 1014 may interact with a removable storage unit 1018. Removable storage unit 1018 includes a computer usable or readable storage device having stored thereon computer software (control logic) or data. Removable storage unit 1018 may be a floppy disk, magnetic tape, compact disk, DVD, optical storage disk, or any other computer-data storage device. Removable storage drive 1014 reads from and writes to removable storage unit 1018 in a well-known manner.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

According to an exemplary embodiment, secondary memory 1010 may include other means, instrumentalities, or other approaches for allowing computer programs, other instructions, or data to be accessed by computer system 1000. Such means, instrumentalities, or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired or wireless, and which may include any combination of LANs, WANs, the Internet, etc. Control logic or data may be transmitted to and from computer system 1000 via communication path 1026.

In an embodiment, a tangible apparatus or article of manufacture comprising a tangible computer-useable or -readable medium having control logic (software) stored thereon is also referred to herein as a computer-program product or program-storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Figure 11A:
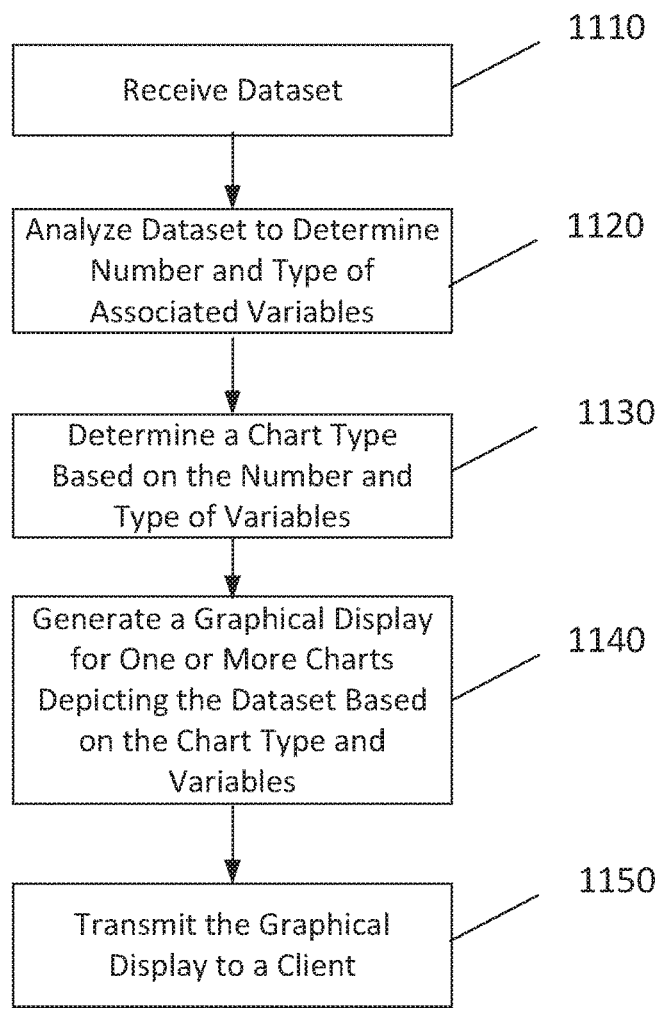
FIG. 11A shows an example flowchart of a method for automatically generating a chart, according to some embodiments.
Figure 11B:
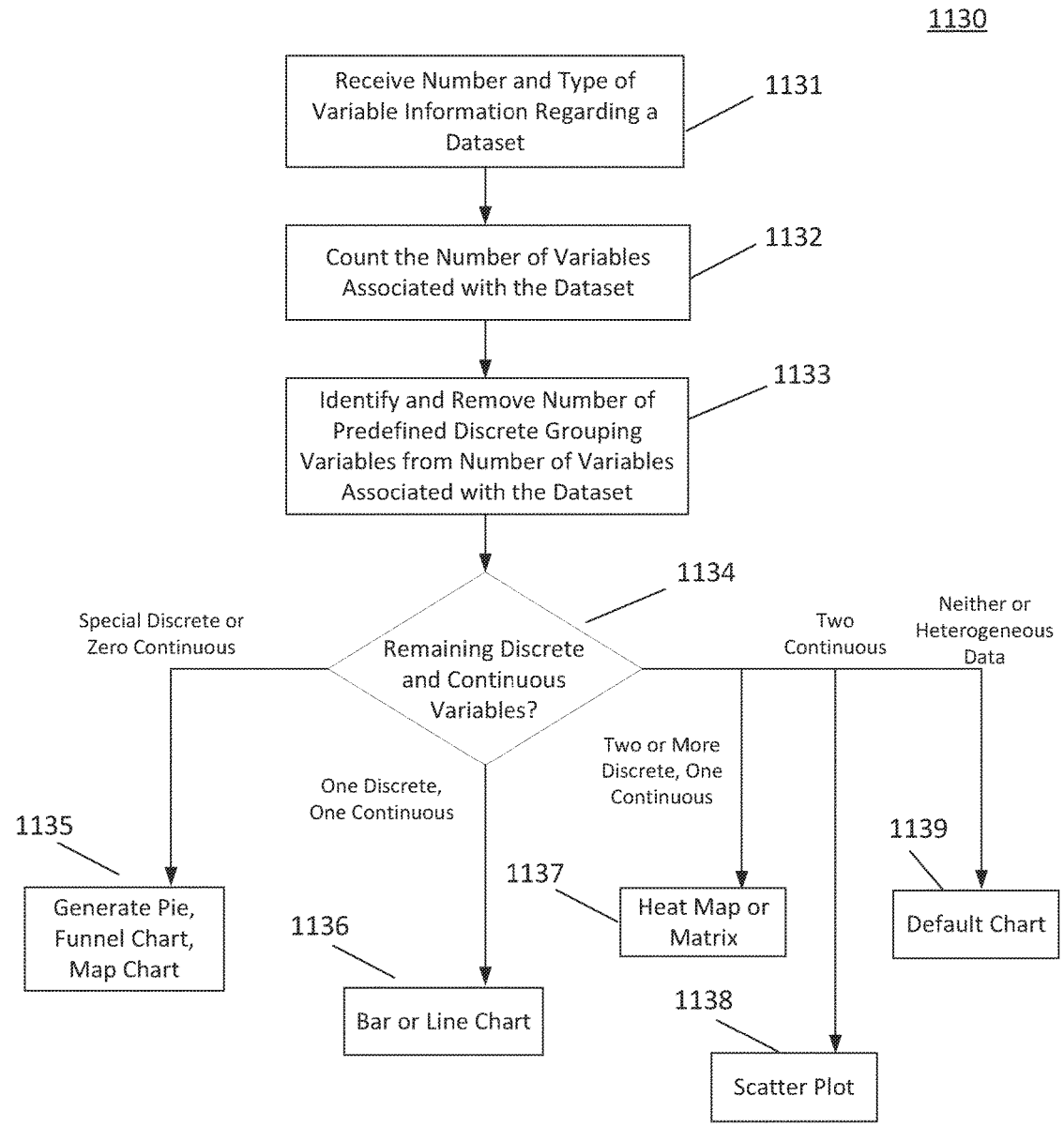
FIG. 11B shows an example flowchart of a method for automatically selecting a chart type, according to some embodiments.

FIGS. 11A-11B contain a method 1100 for automatically generating a chart and a method 1130 automatically selecting a chart type. In methods 1100 and 1130, operations are not limited to the order described below, and various operations may be performed in a different order. Further, two or more operations of each method can be performed simultaneously with each other.

FIG. 11A shows an example flowchart of a method 1100 for automatically generating a chart, according to some embodiments. A computer system may execute method 1100 to generate one or more charts instantiated in the GUIs depicted in FIGS. 2A-2D, 3A-3C, 4A-4B, 5, 6A-6B, and 7-9. In an embodiment, the system depicted in FIG. 1 may also execute method 1100 to generate one or more charts. Method 1100 accepts a set of data intended for display in chart form. Based on the attributes of the data, method 1100 selects a chart type and determines how to formulate the axes of the chart to best visually represent the data. Once the chart has been compiled, the chart is output to allow user viewing.

At 1110, a dataset is received. In an embodiment, a user may input desired data into a computer system executing method 1100. The user may employ data entry techniques to generate a dataset. The dataset may include data and/or information related to employee or agent identification, number of sales, amount of revenue generated, number of opportunities, and/or time information, such as, for example, the month, quarter, and/or year. In an embodiment, a dataset may be received at a server from a database already containing data.

At 1120, the dataset is analyzed to determine the number and type of variables associated with the dataset. In an embodiment, a computer system, processor, and/or server performs this analysis. This analysis also depends on the type of information contained within the dataset and how the information is entered and/or recorded. In an embodiment, the data may be recorded in a table-oriented manner and may be stored in a relational database. In an embodiment, the data may be recorded in an object-oriented manner and may be stored in an object database. In either embodiment, attributes of the data are grouped to determine the number of variables related to the data as well as the variable type.

In an object-oriented system, the data may be grouped based on an employee or agent identification. Based on the recorded data, the attributes of the dataset may be determined. For example, a piece of data may reflect that "Agent 1 generated $900,000 in revenue in 2015." Based on this data, three variables exist: (1) the agent identification number, (2) the amount of revenue generated, and (3) the year. Many similar pieces of data may exist in the dataset among different agent identifications, revenues, and years. In an embodiment, a piece of data may reflect that "Agent 1, a United States agent, generated $100,000 in revenue during the month of January 2015." Based on this data, five variables exist: (1) the agent identification number, (2) the agent's region, (3) the amount of revenue generated, (4) the month, and (5) the year. In an embodiment, a piece of data may reflect that "Agent 1, a European Union agent, had 100 opportunities and generated $100,000 in revenue during the month of February 2016." Based on this data, six variables exist: (1) the agent identification number, (2) the agent's region, (3) the number of the agent's opportunities, (4) the amount of revenue generated, (5) the month, and (6) the year. The number of the agent's opportunities may be the number of potential new clients assigned to the agent during a predetermined time period. In an embodiment, the dataset may contain may instances of each of these pieces of data related to each agent identification.

At 1120, in addition to determining the number of variables associated with the dataset, the dataset is analyzed to determine the type of variables associated with the dataset. In an embodiment, the variables associated with the dataset are grouped into "discrete" and "continuous" variables. Discrete variables include data with finite values or categories, such as, for example, an agent identification, the agent's region, month information, and year information. Continuous variables include data that may form a numerical spectrum, such as, for example, the amount of revenue generated and/or the number of opportunities available. In an embodiment, the year may be considered a continuous variable if not used categorically to group data.

In an embodiment, the data in the dataset may be organized by project and/or stages of a project. For example, the recorded data may reflect that "Stage 1 of Project 3 is expected to generate $100,000 in profits." The dataset may include many pieces of data related to various stages, various projects, and various amounts. In an embodiment, the analysis of the dataset recognizes the data type as being a "piece of a whole" or a stage of a project based on the types of associated variables. Under this determination, the variables associated with the data in the dataset may be categorized as discrete variables because the values represent subsets of a stage and/or project. In an embodiment, the numerical amount of profits generated under this scheme is categorized as a discrete variable.

At 1130, a chart type is determined based on the determination of the number and type of variables associated with the dataset. FIG. 11B depicts an embodiment of a method for determining a chart type based on the attributes of the dataset. In an embodiment, the chart type may be a bar chart, a scatter plot, a line graph, a heat map, a matrix, a pie chart, a funnel chart, and/or a map chart. In an embodiment, one or more chart types may be determined. The determination of the chart type is based on a motivation to effectively visually display information based on the type of information provided in the received dataset. For example, one motivation may be to display as much information as possible based on the dataset. In an embodiment, a chart may be selectively chosen to display information to highlight a specific variable. For example, a line graph may be selected to demonstrate a change over time, based on a time-related variable such as a month, quarter, or year.

At 1140, once a chart type has been determined, a graphical display for one or more charts depicting the dataset may be generated based on the determined chart type and the variables associated with the dataset. At 1140, chart axes, colors, objects, and organization may be determined. In an embodiment, a service provider, as depicted in FIG. 1, may generate the graphical display. In an embodiment, a display device and/or client may generate the graphical display.

To generate the display, the chart type and variables associated with the dataset are considered. In an embodiment, the charts are generated in a manner that visually groups as many variables as possible in order to display as much information as possible. To visually group variables, variables may be configured along the axes of the charts to allow for grouping. For example, as seen in FIG. 2A, agents may be grouped by regions based on agent identification. Additionally, sales may be grouped by year to generate multiple charts. Grouping common variables when generating a graphical user interface allows more information to be organized in a manner helpful for visualizing. FIGS. 2A-2D, 3A-3C, 4A-4B, 5, 6A-6B, and 7-9 depict embodiments of grouping variables.

In an embodiment, predetermined variables may be grouped. For example, when generating a chart, region information or time information, such as month, quarter, or year, may be grouped. That is, method 1100 may recognize certain variables to use as groupings rather than as discrete axes points. For example, if the dataset stores information such as "Agent 1, a United States agent, generated $100,000 in revenue during the month of January 2015," method 1100 may recognize the region as "United States" and year as "2015." These variables may be extracted and used to determine the number of graphs associated with the underlying dataset. In an embodiment, the number of charts generated may equal the number of regions in the underlying dataset multiplied by the number of years of captured data. When generating the charts, the charts may be organized by the groupings and built to display visually on a graphical user interface.

In an embodiment, the variables associated with the dataset may be grouped based on reoccurring discrete variables across the dataset. For example, at 1120, when the dataset is analyzed and the number and type of associated variables are determined, frequently occurring discrete variables may be grouped. If the dataset stores information such as "Agent 1, a United States agent, generated $100,000 in revenue during the month of January 2015," when generating the charts, the dataset may recognize that the region as "United States" and month as "January 2015." In this embodiment, the number of charts generated may be the number of regions multiplied by the number of months where information is available in the dataset. FIG. 4A depicts an embodiment of this type of graphical user interface with various months and years grouped. FIG. 4A also depicts agents grouped by region.

In an embodiment, the number of charts, the variable groupings, and/or the axis labels depend on the number of continuous variables of the dataset. As explained with reference to FIG. 11B, the number of continuous variables may also be used to determine the chart type used to depict the dataset. In an embodiment, when generating the charts, the data may be analyzed and the continuous variables used as axes. That is, continuous variables will not be extracted and used to group variables. For example, the dataset may store data in the form: "Agent 1, a European Union agent, had 100 opportunities and generated $100,000 in revenue during the month of February 2016." In an embodiment, the continuous variables—number of opportunities and revenue generated—will be identified and utilized as axis information rather than extracted as grouping information. FIGS. 3A-3C depict embodiments where opportunities are charted against sales in a scatter plot and demonstrate an example of utilizing two continuous variables as axes.

In addition to generating the appropriate axis labels and number of charts that depict the dataset, data points corresponding to the dataset are also generated and organized in relation to the axes. The data points represent the correlation between the axes used in the chart. In an embodiment where one or more bar charts are generated, as depicted in FIGS. 2A-2D, continuous values are indicated using bars. The bars may be different sizes and/or colors to add an additional element and medium of displaying a discrete value. For example, red bars may signify senior agents while blue bars may signify junior agents.

In an embodiment, where a scatterplot is generated, such as the scatterplots depicted in FIGS. 3A-3C, data points may show the correlation between two continuous variables. For example, each data point may chart the amount of sales revenue correlated to the number of opportunities. In an embodiment, each data point may represent different agents. To depict the different agents, the data points may be different colors. Using color allows the chart to display another discrete variable not listed explicitly as an axis label or axis label grouping. In an embodiment, data points may provide additional dataset information if a user interacts with the data point, by, for example, selecting the data point. Additional information may be overlayed on the chart.

In an embodiment, where a matrix or heat map is generated, such as the charts depicted in FIGS. 4A-4B, data points may show the correlation between two discrete variables used as axis labels. In the matrix context, a data point may reflect whether a threshold has been met or not met. For example, with reference to FIG. 4A, a filled-in space may signify that that an agent has generated at least $500,000 in sales for a given month. A legend may be provided to add to the significance of the matrix data point. In an embodiment, a heat map may be generated in the charts. That is, each data point may be represented using color and/or a grayscale to show a continuous variable. For example, the matrix depicted in FIG. 4A may be filled with grayscale values correlated to the revenue generated by an agent in a given month. In an embodiment, a darker or blacker data point correlates to more revenue generated while a lighter or whiter data point correlates to less revenue generated. A user may also interact with the data point in order to gain more information, such as a specific revenue number. This information may be provided in the form of an overlay over the chart.

At 1150, once a graphical display of one or more charts has been generated, the graphical display may be transmitted to a client. In an embodiment, a service provider performs the chart generation and send information to a client so that the charts may be graphically displayed on a display device using a graphical user interface. In an embodiment, a scripting programming language may be utilized to send the charts to the display devices. This transmission may be optional. In an embodiment, the one or more charts may be generated at a client and may be displayed directly by the client device without the need for transmission.

Once a display device has received the graphical display containing one or more charts, a user may interact with the displayed data. In an embodiment, a user may manipulate the chart in various ways. For example, a user may zoom in or zoom out generally, zoom in or zoom out specific charts, rotate charts, select different filters, hide or display desired variables, change the variables being displayed on the axes, and/or choose different groupings of variables. In an embodiment, a user may also change the chart type to further explore and visualize the dataset in a manner different from the original presentation. In an embodiment, this interaction occurs on a graphical user interface of a display device in the form of a swipe motion on a display screen and/or selection of various filters based on menu options. These interactions may then be sent through a network to a service provide to recalculate different chart views and/or configurations. In an embodiment, manipulation of the charts occurs on the display device, and the display device generates new visual chart information in response to the manipulation. This manipulation allows for the trellis chart features described above.

As demonstrated in the transition between FIG. 2A and FIG. 2B, more agent information and more year information may be requested based on an interaction from a user. This transition provides an example of a trellis chart configuration. In this embodiment, the scaling for the size of the bars, the relative distance between each bar, and the scale utilized to measure each bar are adjusted to avoid cluttering. In this manner, more information is able to be displayed while still maintaining readable axes labels. This scaling further occurs in the transition from FIG. 2B to FIG. 2C and from FIG. 2C to FIG. 2D.

To determine how to scale the axes, the amount of available pixels on a display device may be determined. The amount of pixels may then be apportioned into the appropriate number of graphs intended for display. For example, a screen may utilize 1500 horizontal pixels and 800 vertical pixels. If one chart is displayed, the number of axes labels may be determined to have a certain number of axis labels divided evenly to fill the 1500 horizontal pixels. If more than one graph is generated, however, the number of pixels remains constant but the number of axis labels must be further apportioned to the different graphs. For example, in FIG. 2A, two years are depicted across the horizontal axis, generating two columns of graphs. This apportionment means that half of the pixels should be provided to each graph. Utilizing this process, if the original graph utilized 18 axis labels for Sales in Millions, each graph in FIG. 2A would utilize 9 of the axis labels.

In an embodiment, axis labels are not defined purely by the number of pixels but also by the maximum depicted value. For example, the maximum value depicted in FIG. 2A is 40 million, indicating an axis label greater than this value is not necessary. In this embodiment, the maximum value and a zero value are utilized to scale the axis. The axis may be divided into easy-to-identify numbers such as multiples of five or ten. The number of axis labels may be determined by dividing the space between the maximum value and the zero value into intervals able to fit the space between. This division may be based on the pixels available as well as the size of the text characters representing the axis divisions. Similarly, a minimum and maximum value may be utilized together to generate the chart scaling.

Transition from FIG. 2A to FIG. 2B, a new scaling may be calculated based on the maximum value and available pixels based on the number of charts needed for generation. In the embodiment depicted in FIG. 2B, the intervals have changed to multiples of ten, from the multiples of five depicted in FIG. 2A, to avoid cluttering the values in axis. Similarly, in FIG. 2C, the axis has been scaled to only the zero value and the maximum value due to a lack of available pixels between the values. In an embodiment, if space permits, a multiple of twenty may have been utilized.

FIG. 2D provides an example of changing a discrete variable axis to depict less granularity with discrete variables. In FIG. 2D, individual agent labels are hidden to reduce clutter and create a more visually appealing graphical user interface.

The embodiment depicted in FIG. 6B also provides an example of axis label scaling in the form of selecting a line chart. A user may select a specific chart to view. Based on this selection, the axis information may change to utilize more pixels and better highlight the depicted data.

Based on the user interaction with a generated chart, various levels of granularity may be displayed. Users may decide to view many generated charts or few generated charts. Allowing a user select a specific level of granularity grants users the ability to efficiently navigate datasets in a visual manner.

FIG. 11B shows an example flowchart of a method 1130 for automatically selecting a chart type, according to some embodiments. Method 1130 may be utilized in method 1100 for selecting a chart type for a particular dataset based on the number of variables and types of variables associated with the dataset. Variables may be analyzed based on whether the variable is discrete or continuous. In an embodiment, method 1130 selects a chart type that visually displays and organizes as much information as possible.

At 1131, information about the number and type of variables associated with a dataset is received. A computing device and/or processor may have analyzed a dataset and extracted this information, determining the number of variables as well as whether the variables are discrete or continuous. In an embodiment, at 1131, a dataset is received and a computing device performs an analysis to determine the number of variables and the types of variables associated with the dataset. A dataset may be analyzed in a manner similar to the analysis associated with 1120 in FIG. 2A.

At 1132, the number of variables associated with a dataset may be counted. This number may be provided at 1131 or may be determined through further analysis of the information provided. For example, a counter and/or computing device may identify data types with the dataset and count the number of different data types similar to the example provided in the analysis associated with 1120 in FIG. 2A. In an embodiment, a processor or computing device may store this number in memory such as a buffer and/or random access memory for use in later calculations for chart selection.

At 1133, predefined grouping variables are identified and removed from the number of variables associated with the dataset. By identifying certain predefined grouping variables, the chart type and number of charts may be determined and better display more information. The remaining variables that are ungrouped may be utilized to determine the chart type used. In an embodiment, the identification and removal result in a subtraction from the total number of variables.

For example, a dataset may store data in the form "Agent 1, a United States agent, generated $100,000 in revenue during the month of January 2015." Based on this data, five variables exist: (1) the agent identification number, (2) the agent's region, (3) the amount of revenue generated, (4) the month, and (5) the year. The determination of five variables may be made at 1131 and/or 1132.

After determining the number of variables, a determination of predefined discrete grouping variables may be made. These predefined grouping variables may be stored in a memory device in, for example, a list and/or table. These predefined grouping variables may be variables that are commonly used or grouped using a priori knowledge of the datasets typically analyzed. In an embodiment, a list of predefined discrete grouping variables may be built by analyzing frequently occurring discrete variables within the dataset and optimizing for the most frequently occurring variables. For example, a predefined discrete grouping variable may be a region, and/or year.

This list is then compared to the attributes of the variables of the current dataset. The number of predefined discrete grouping variables is subtracted, or removed, from the total number of variables. For example, if the dataset utilizes five variables, (1) the agent identification number, (2) the agent's region, (3) the amount of revenue generated, (4) the month, and (5) the year, and the two predefined discrete grouping variables are (1) the region and (2) the year, these two are subtracted from the five dataset variables. The remaining difference is then three variables: the agent identification number, the month, and the revenue generated. These variables represent two discrete variables and one continuous variable respectively. The number of remaining discrete and continuous variables will be used at 1134 to determine the appropriate chart type.

In another embodiment, the dataset may utilize six variables: (1) the agent identification number, (2) the agent's region, (3) the number of the agent's opportunities, (4) the amount of revenue generated, (5) the month, and (6) the project stage. The predefined variables may be the agent's region and the project stage. Subtracting the predefined variables causes two continuous variables to remain, the number of opportunities and the amount of revenue generated, along with two discrete variables, the agent identification number and the month. The number of remaining discrete and continuous variables will be used at 1134 to determine the appropriate chart type.

At 1134, the number and type of remaining discrete and continuous variables are examined to determine an appropriate chart type. In an embodiment, an exact number of discrete and continuous variables must exist for a chart to be selected. For example, to generate a heat map chart at 1137, two or more discrete variables and one continuous variable must remain after removing the predefined variables. In an embodiment, exceeding a threshold variable type may be required. For example, if the two or more continuous variables exist, a scatter plot at 1138 will be selected regardless of the number of remaining discrete variables. In an embodiment, a special condition may be detected from a discrete variable to signify which chart to select. For example, if a remaining discrete variable signifies a "project number" or states a "part of a whole," a pie chart may be generated at 1135.

At 1135, a pie chart, a funnel chart, or a map chart may be generated based on the remaining variables determined at 1133. One of these chart types may be selected for use in method 1100 to generate a graphical user display of a provided dataset. In an embodiment, one of these chart types may be selected when no continuous variables exist after predefined grouping variables are subtracted. For example, a dataset may store information in the form, "Twenty percent of Stage 1 sales in the United States were generated from the sale of shoes." The variables associated with this dataset may be (1) a percentage of sales, (2) the stage of sales, (3) the region, and (4) the product. In an embodiment, the percentage of sales may be considered a discrete variable because it is categorical and represents a "part of a whole" rather than a pure numerical value. In this case, no continuous values exist leading to a determination of using a pie chart. Even after the subtraction of predefined discrete grouping variables, such as the stage, region, and/or product, no continuous values would exist. Thus, a pie chart may be selected.

In an embodiment, a special condition may be detected from a discrete variable to signify which chart type to select. For example, a computing device and/or processor may recognize the term "percentage" as being "part of a whole" and generating a pie chart to display that information. In an embodiment, the computing device may recognize information based on stages of a project to indicate the usage of a funnel chart. In this case, a special discrete variable may be utilized to generate a funnel chart. A funnel chart may be generated when a project stage is not a predefined discrete grouping variable. In an embodiment, a remaining discrete variable may indicate geographical location and/or highlight a region area that may be more apt to be seen in a map chart. For example, if the region is not a predefined discrete grouping variable, a map chart may be generated to display At 1136, a bar or line chart may be generated if one discrete variable and one continuous variable remain after the subtraction at 1133. In an embodiment, determining whether to generate a bar or line chart depends on the remaining discrete variable and the definition of which variables are the predefined discrete grouping variables. For example, a dataset may state that "Agent 1 generated $100,000 in revenue in the year 2010." In this example, the dataset contains three variables: (1) the agent identification, (2) the revenue generated, and (3) the year. In an embodiment, the year may be a predefined grouping variable, leaving one discrete variable, the agent identification, and one continuous variable, the revenue generated. In this embodiment, a bar chart may be generated using the agent identification and revenue generated variables as axes for the chart. Multiple charts may be utilized to represent each year, as seen, for example, in FIGS. 2A-2D.

In an embodiment, the agent identification may be a predefined grouping variable, leaving the year as a categorical discrete variable and the revenue generated as a continuous variable. In this embodiment, a line chart may be produced. Similarly, if a different measure of time, such as months or quarters, were utilized, a line chart may also be produced. In an embodiment, a line chart may be used to demonstrate changes with respect to time while other discrete variables will yield bar charts. Multiple charts may be utilized to represent different agents or users, as seen, for example, in FIGS. 6A-6B and 7-9.

At 1137, a matrix or heat map chart may be produced if two discrete variables and one continuous variable remain. In an embodiment, matrix or heat map charts may be useful to compare two discrete variables using two axes while displaying a continuous value within the chart area. FIGS. 4A-4B depict embodiments of a matrix or heat map chart. For a matrix or heat map chart, two discrete variables may be compared, such as, for example, an agent identification number and a month. The chart area may then be utilized to display a continuous value, such as revenue generated. In a matrix chart, a binary value may be determined. For example, the chart area may depict whether a particular agent has generated more than $100,000 in a given month. The matrix will depict a different color and/or symbol for both binary states. In an embodiment, multiple states may be utilized using different colors and/or symbols. For example, the chart area may utilize the color red for "Below $300,000," the color yellow for "Between $300,000 and $600,000," and the color green for "Above $600,000."

For a heat map, the chart area may depict a continuous value by utilizing different colors and/or a grayscale to depict a continuous value. In an embodiment, a darker or blacker data point correlates to more revenue generated while a lighter or whiter data point correlates to less revenue generated.

At 1138, a scatter plot may be produced if two continuous variables remain. In an embodiment, if two continuous variables are detected as remaining, the number of remaining discrete variables does not alter the chart type selected. A scatter plot may utilize the two continuous variables as axes for the chart and utilize the data points to display other predefined grouping variables. For example, a dataset may be of the form "Agent 1, a European Union agent, had 100 opportunities and generated $100,000 in revenue during the month of February 2016." Based on this data, six variables exist: (1) the agent identification number, (2) the agent's region, (3) the number of the agent's opportunities, (4) the amount of revenue generated, (5) the month, and (6) the year. Based on an analysis of this data, even after removing any predefined discrete groupings, two continuous variables will exist: the number of opportunities and the amount of revenue generated. In an embodiment, a scatter plot will be selected, using these values as axes. The predefined grouping variables may then be used to determine the number of charts, for example, using the region and month and/or year information. The data points may also be used to depict discrete grouping variable information, such as, for example, a unique agent identification.

In an embodiment, if the number of variables does not match any of the specified conditions for 1135-1138, a default chart may be used at 1139. The default chart may be predefined. A computing device utilizing method 1130 may store a predefined chart type as the default chart. In an embodiment, the default chart may be determined based on the number and type of remaining variables. For example, if one continuous variable is remaining with more than two discrete variables, the default chart may seek to display as much information as possible while hiding discrete variables for later selection and viewing. In an embodiment, a heat map may be utilized to display two discrete variables along with the continuous variable. In an embodiment, if not enough variables are present after grouping, the information in the dataset may be displayed as lists. In an embodiment, the lists are displayed in a manner grouped by any identifiable predefined grouping variables.

In an embodiment, if three or more continuous variables are present at 1134, a default scatter plot may be utilized. Two of the continuous variables may be selected to use as axes while the other continuous variables may be hidden. In an embodiment, the two continuous variables selected may be the first two variables identified regarding the dataset. In an embodiment, the data points may utilize a color or grayscale gradient to represent the third continuous variable. Any remaining variables may be hidden from the visual chart display.

In an embodiment, if a dataset is heterogeneous, meaning that the dataset contains multiple forms of data, a default chart may be utilized. For example, gaps of information may exist in the dataset. One data point may state that "Agent 1 generated $100,000 in revenue in January 2015" while another data point may state that "Agent 2 generated $900,000 in 2015." In this embodiment, a default chart may be utilized based on the data point with the fewest variables. For example, a computing device may aggregate the 2015 revenues for Agent 1 and display the revenue information on a per year basis.

In an embodiment, the dataset may be in a form lacking sufficient information to select an appropriate chart type. For example, the dataset may contain vastly different data points that do not share common variables. In this embodiment, the default chart may be an error message. The default chart may chart as many points as possible, selecting an appropriate chart type but may also include a message indicating that other data points are not shown.

Based on the teachings contained in this disclosure, it will be apparent to persons skilled in the relevant art(s) how to make and use embodiments of the invention using data processing devices, computer systems, or computer architectures other than that shown in FIG. 10. In particular, embodiments may operate with software, hardware, or operating system embodiments other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, or entities illustrated in the figures and described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
generating, by one or more processors, a trellis chart including a plurality of sub-charts;
receiving, by the one or more processors, a zoom interaction with the trellis chart;
in response to the zoom interaction, displaying a subset of the plurality of sub-charts;
calculating the minimum and maximum values for a corresponding axis of each of the sub-charts within the subset of the trellis chart;
determining an axis and an associated scale that includes the calculated minimum and maximum values; and
applying the determined axis to each of the sub-charts of the displayed subset.

2. The method of claim 1, further comprising:
calculating the number of discrete values corresponding to the subset of the plurality of sub-charts;
determining a second axis and an associated scale based on the number of discrete variables associated with the subset of the plurality of sub-charts; and
applying the second determined axis to each of the sub-charts of the displayed subset.

3. The method of claim 1, wherein the determined axis includes more axis data labels than the axis associated with the trellis chart.

4. The method of claim 1, wherein the plurality of sub-charts and the subset of the plurality of sub-charts are organized according to predefined discrete variables.

5. The method of claim 1, further comprising:
receiving a selection interaction on a portion of a first sub-chart of the subset, wherein the portion corresponds to an axis value;
modifying the first sub-chart to include a first visual indicator at the portion, wherein the first visual indicator corresponds to the axis value; and
modifying a second sub-chart of the subset to include a second visual indicator at a second portion of the second sub-chart corresponding to the axis value.

6. The method of claim 1, wherein the subset of the plurality of sub-charts is a sub-chart.

7. The method of claim 6, further comprising:
receiving a swipe interaction on the sub-chart; and
in response to the receiving, displaying a different sub-chart of the plurality of sub-charts.

8. A system, comprising:
a memory device; and
one or more processors, configured to:
generate a trellis chart including a plurality of sub-charts;
receive a zoom interaction with the trellis chart;
in response to the zoom interaction, display a subset of the plurality of sub-charts;
calculate the minimum and maximum values for a corresponding axis of each of the sub-charts within the subset of the trellis chart;
determine an axis and an associated scale that includes the calculated minimum and maximum values; and
apply the determined axis to each of the sub-charts of the displayed subset.

9. The system of claim 8, wherein the one or more processors are further configured to:
calculate the number of discrete values corresponding to the subset of the plurality of sub-charts;
determine a second axis and an associated scale based on the number of discrete variables associated with the subset of the plurality of sub-charts; and
apply the second determined axis to each of the sub-charts of the displayed subset.

10. The system of claim 8, wherein the determined axis includes more axis data labels than the axis associated with the trellis chart.

11. The system of claim 8, wherein the plurality of sub-charts and the subset of the plurality of sub-charts are organized according to predefined discrete variables.

12. The system of claim 8, wherein the one or more processors are further configured to:
receive a selection interaction on a portion of a first sub-chart of the subset, wherein the portion corresponds to an axis value;
modify the first sub-chart to include a first visual indicator at the portion, wherein the first visual indicator corresponds to the axis value; and
modify a second sub-chart of the subset to include a second visual indicator at a second portion of the second sub-chart corresponding to the axis value.

13. The system of claim 8, wherein the subset of the plurality of sub-charts is a sub-chart.

14. The system of claim 13, wherein the one or more processors are further configured to:
receive a swipe interaction on the sub-chart; and
in response to the receiving, display a different sub-chart of the plurality of sub-charts.

15. A non-transitory computer-readable storage device having instructions stored thereon that, when executed by at least one computing device, causes the at least one computing device to perform operations comprising:
generating, by one or more processors, a trellis chart including a plurality of sub-charts;
receiving, by the one or more processors, a zoom interaction with the trellis chart;
in response to the zoom interaction, displaying a subset of the plurality of sub-charts;
calculating the minimum and maximum values for a corresponding axis of each of the sub-charts within the subset of the trellis chart;
determining an axis and an associated scale that includes the calculated minimum and maximum values; and
applying the determined axis to each of the sub-charts of the displayed subset.

16. The non-transitory computer-readable storage device of claim 15, the operations further comprising:
calculating the number of discrete values corresponding to the subset of the plurality of sub-charts;
determining a second axis and an associated scale based on the number of discrete variables associated with the subset of the plurality of sub-charts; and applying the second determined axis to each of the sub-charts of the displayed subset.

17. The non-transitory computer-readable storage device of claim 15, wherein the determined axis includes more axis data labels than the axis associated with the trellis chart.

18. The non-transitory computer-readable storage device of claim 15, wherein the plurality of sub-charts and the subset of the plurality of sub-charts are organized according to predefined discrete variables.

19. The non-transitory computer-readable storage device of claim 15, the operations further comprising:
  receiving a selection interaction on a portion of a first sub-chart of the subset, wherein the portion corresponds to an axis value;
  modifying the first sub-chart to include a first visual indicator at the portion, wherein the first visual indicator corresponds to the axis value; and
  modifying a second sub-chart of the subset to include a second visual indicator at a second portion of the second sub-chart corresponding to the axis value.

20. The non-transitory computer-readable storage device of claim 15, wherein the subset of the plurality of sub-charts is a sub-chart, and wherein the operations further comprises:
  receiving a swipe interaction on the sub-chart; and
  in response to the receiving, displaying a different sub-chart of the plurality of sub-charts.

* * * * *